(12) United States Patent
Noguchi et al.

(10) Patent No.: US 6,558,768 B2
(45) Date of Patent: May 6, 2003

(54) OPTICAL RECORDING MEDIUM AND OPTICAL RECORDING AND READING METHOD USING THE SAME

(75) Inventors: Soh Noguchi, Kanagawa (JP); Tsutomu Satoh, Kanagawa (JP); Tatsuya Tomura, Tokyo (JP); Noboru Sasa, Kanagawa (JP); Yasunobu Ueno, Kanagawa (JP); Yasuhiro Higashi, Miyagi (JP); Ikuo Shimizu, Mie (JP); Hiroshi Toyoda, Mie (JP); Motoharu Kinugasa, Mie (JP); Shiho Yamada, Aichi (JP); Masanori Ikuta, Mie (JP); Kenji Mutoh, Tokyo (JP)

(73) Assignees: Ricoh Company, Ltd., Tokyo (JP); Kyowa Hakko Kogyo Co., Ltd., Tokyo (JP); Kyowa Yuka Co., Ltd., Tokyo (JP)

( * ) Notice: Subject to any disclaimer, the term of this patent is extended or adjusted under 35 U.S.C. 154(b) by 0 days.

(21) Appl. No.: 09/798,565

(22) Filed: Mar. 2, 2001

(65) Prior Publication Data

US 2001/0044001 A1 Nov. 22, 2001

(30) Foreign Application Priority Data

Mar. 7, 2000 (JP) .......................................... 2000-062437
Feb. 14, 2001 (JP) .......................................... 2001-036632
Feb. 14, 2001 (JP) .......................................... 2001-036663

(51) Int. Cl.$^7$ ................................................. B32B 3/02
(52) U.S. Cl. ................... 428/64.1; 428/64.4; 428/64.8; 430/270.14
(58) Field of Search ................ 428/64.1, 64.4, 428/64.8, 457, 913; 430/270.14, 495.1, 945

(56) References Cited

U.S. PATENT DOCUMENTS 5,939,163 A * 8/1999 Ueno et al. ................. 428/64.1

(List continued on next page.)

FOREIGN PATENT DOCUMENTS

EP 0844243 5/1998

(List continued on next page.)

OTHER PUBLICATIONS

European Search report, European appln. No. 01105270.1–2210–May 31, 2001.

Primary Examiner—Elizabeth Mulvaney
(74) Attorney, Agent, or Firm—Cooper & Dunham LLP

(57) ABSTRACT

An optical recording medium has a substrate and a recording layer formed thereon, the recording layer containing at least one squarylium compound and one azo metal chelate compound including an azo moiety of formula (I-1) or (I-2) and a metal:

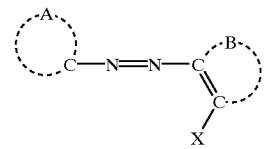

(I-1)

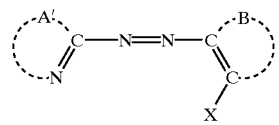

(I-2)

wherein A, B, A', and X are the same as those previously defined in the specification. Writing and reading steps are performed by the application of a semiconductor laser beam with a wavelength in a range from 600 to 720 nm.

16 Claims, 2 Drawing Sheets

U.S. PATENT DOCUMENTS 6,057,020 A * 5/2000 Ueno et al. ............... 428/64.1
6,197,477 B1 * 3/2001 Satoh et al. ........... 430/270.16
2002/0048646 A1 * 4/2002 Tomura .................... 428/64.4

FOREIGN PATENT DOCUMENTS

| EP | 0881636 | 12/1998 |
| EP | 0887202 | 12/1998 |
| EP | 0981132 | 2/2000 |

* cited by examiner

OPTICAL RECORDING MEDIUM AND OPTICAL RECORDING AND READING METHOD USING THE SAME

BACKGROUND OF THE INVENTION

1. Field of the Invention

The present invention relates to an optical recording medium with a large capacity for storing data, capable of recording information therein and reading the information therefrom by the application of light with short wavelength, and an optical recording and reading method using the above-mentioned optical recording medium.

2. Discussion of Background a. Prior arts concerning a recording medium of a write once read many (WORM) type are as follows:

(1) A recording medium using a cyanine dye as a recording material: disclosed in Japanese Laid-Open Patent Application Nos. 57-82093, 58-56892, 58-112790, 58-114989, 59-85791, 60-83236, 60-89842, and 61-25886.

(2) A recording medium using a phthalocyanine dye as a recording material: disclosed in Japanese Laid-Open Patent Application Nos. 61-150243, 61-177287, 61-154888, 61-24609, 62-39286, 63-37991, and 63-39888.

b. Prior arts concerning a WORM type compact disc (CD-R) are as follows:

(1) CD-R employing the combination of a cyanine dye and a metal reflection layer: disclosed in Japanese Laid-Open Patent Application Nos. 1-159842, 2-42652, 2-13656, and 2-168446.

(2) CD-R employing the combination of a phthalocyanine dye and a metal reflection layer: disclosed in Japanese Laid-Open Patent Application Nos. 1-176585, 3-215466, 4-113886, 4-226390, 5-1272, 5-171052, 5-116456, 5-96860, 5-139044, and 5-139044.

(3) CD-R employing the combination of an azo metal chelate dye and a metal reflection layer: disclosed in Japanese Laid-Open Patent Application Nos. 4-46186, 4-141489, 4-361088, 5-279580, 7-51673, 7-161069, 7-37272, 7-71867, 8-231866, and 8-295811.

c. Prior arts concerning a digital video disk (DVD-R) with a large capacity are as follows:

(1) DVD-R employing the combination of a cyanine dye and a metal reflection layer: reported in PIONEER R&D vol. 6, No. 2 (1996), "Development of DVD-Recordable" and "Fundamental Development of DVD-R"; ISOM/ODS '96 (1996), "High Density of Recording on Dye Material Disc Approach for 4.7G"; and Japanese Laid-Open Patent Application No. 10-235999.

(2) DVD-R employing the combination of an azomethine dye and a metal reflection layer: disclosed in Japanese Laid-Open Patent Application Nos. 8-198872, 8-209012, 8-283263, and 10-273484.

(3) DVD-R employing the combination of an azo metal chelate dye and a metal reflection layer: disclosed in Japanese Patent Publication No. 5-67438 and Japanese Laid-Open Patent Application Nos. 7-161069, 8-156408, 8-231866, 8-332772, 9-58123, 9-175031, 9-193545, 9-274732, 9-277703, 10-6644, 10-6650, 10-6651, 10-36693, 10-44606, 10-58828, 10-86519, 10-149584, 10-157293, 10-157300, 10-157301, 10-157302, 10-181199, 10-181201, 10-181203, 10-181206, 10-188340, 10-188341, 10-188358, 10-208303, 10-214423, 10-228671, 11-12483, 11-28865, 11-42858, 11-134708, and 11-208111.

(4) DVD-R employing the combination of other dyes than those mentioned above and a metal reflection layer: disclosed in Japanese Laid-Open Patent Application Nos. 10-86517, 10-93788, 10-226172, 10-244752, 10-287819, 10-297103, 10-309871, and 10-309872.

(5) DVD-R employing the combination of an azo metal chelate dye, other dyes, and a metal reflection layer: disclosed in Japanese Patent Publication No. 7-51682 and Japanese Laid-Open Patent Application Nos. 11-34499, 11-48612, and 11-105424.

The DVD-R has been developed as a next generation disc with a large capacity. To increase the recording capacity of the DVD-R, various recording materials that can minimize the size of a recording pit are developed, image compression techniques such as Moving Picture Experts Group-2 (MPEG 2) are introduced, and technical development is conducted to shorten the wavelength of the semiconductor laser used to read the recording pit.

An AlGaInP laser diode with a wavelength of 670 nm is only one red semiconductor laser that is on the market for a bar code reader and a measuring instrument. In line with the trend toward high-density optical discs, the red semiconductor laser has been introduced into the optical storage market. To standardize a driving system for a DVD, laser diodes having wavelengths of 630 to 670 nm are currently employed for the light sources. On the other hand, driving systems for a read-only DVD-ROM are put on the market, with the light sources for the driving systems having a wavelength of about 650 nm.

Under such circumstances, the most preferable medium is a DVD-R that can record information therein and read the information therefrom by the application of light with wavelengths of 630 to 670 nm. However, no recording material has been developed that can exhibit sufficient light resistance and storage stability and that can realize the recording and reading operation in practice when driven by an optical pickup system using a laser beam with a wavelength of 670 nm or less.

A squarylium dye is one of the recording materials that can be used in the recording medium for recording information therein and reading the information therefrom by the application of light with wavelengths of 630 to 670 nm. However, the stability of the squarylium dye is extremely poor because of its noticeable photodeterioration. In contrast to this, an azo metal chelate dye has high light resistance. However, the recording medium shows low reflectance when the azo metal chelate dye is used as a recording material in the recording layer.

SUMMARY OF THE INVENTION

Accordingly, it is a first object of the present invention to provide an optical recording medium which is suitable for a DVD-R system using semiconductor laser beams with shorter wavelengths, and shows excellent light resistance and storage stability, in particular, even when the recording medium employs a squarylium dye.

A second object of the present invention is to provide a recording and reading method using the above-mentioned optical recording medium.

The above-mentioned first object of the present invention can be achieved by an optical recording medium comprising a substrate and a recording layer formed thereon, the recording layer comprising at least one squarylium compound and one azo metal chelate compound comprising an azo moiety of formula (I-1) and a metal:

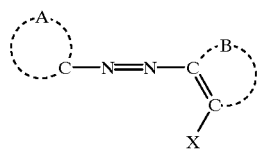
(I-1)

wherein A and B are each independently a residue for forming an aromatic ring which may have a substituent or a heterocyclic ring which may have a substituent in combination with one or two carbon atoms bounded thereto; and X represents a substituent having an active hydrogen group.

Alternatively, the first object of the present invention can also be achieved by an optical recording medium comprising a substrate and a recording layer formed thereon, the recording layer comprising at least one squarylium compound and one azo metal chelate compound comprising an azo moiety of formula (I-2) and a metal:

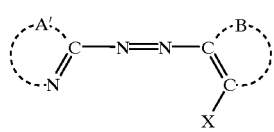
(I-2)

wherein A' is a residue for forming a heterocyclic ring in combination with a carbon atom and a nitrogen atom bonded thereto; B is a residue for forming an aromatic ring or a heterocyclic ring in combination with two carbon atoms bonded thereto; and X represents a substituent having an active hydrogen group.

The above-mentioned second object of the present invention can be achieved by an optical recording and reading method comprising the steps of recording information in the above-mentioned optical recording medium by applying thereto light with wavelengths of 600 to 720 nm, and reading the information from the recording medium by applying thereto light with wavelengths of 600 to 720 nm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
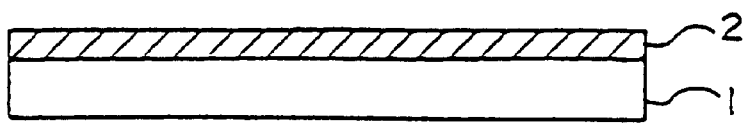
FIG. 1A to FIG. 1D are schematic cross sectional views of optical recording media according to the present invention, each showing the structure of a WORM type optical recording medium.

By providing a recording layer comprising a squarylium dye and another dye with a specific structure, the obtained optical recording medium becomes suitable for the next-generation optical disc system employing a semiconductor laser of wavelength of 670 nm or less, and becomes superior to conventional recording media in terms of light resistance and storage stability.

The optical recording medium of the present invention comprises a substrate and a recording layer formed thereon, the recording layer comprising at least one squarylium compound and one azo metal chelate compound comprising an azo moiety represented by formula (I-1) or (I-2) and a metal.

At least one squarylium compound and one azo metal chelate compound are contained in the recording layer of the optical recording medium, so that photo-deterioration of the squarylium compound can be compensated. Therefore, the obtained optical recording medium can be provided with sufficient light resistance.

As the squarylium compound for use in the present invention, the following compound of formula (II) is preferable:

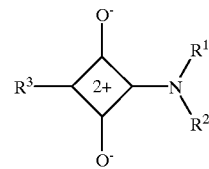
(II)

wherein $R^1$ and $R^2$, which may be the same or different, are each a hydrogen atom, a substituted or unsubstituted alkyl group, a substituted or unsubstituted aralkyl group, or a substituted or unsubstituted aryl group, or $R^1$ and $R^2$ may form a heterocyclic ring which may have a substituent in combination with a nitrogen atom bonded thereto; and $R^3$ is represented by the following formula (III) or (IV):

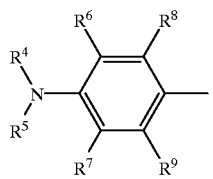
(III)

wherein $R^4$ and $R^5$, which may be the same or different, are each a hydrogen atom or an alkyl group, or $R^4$ and $R^5$ may form a heterocyclic ring which may have a substituent in combination with a nitrogen atom bonded thereto; and $R^6$, $R^7$, $R^8$, and $R^9$, which may be the same or different, are each a hydrogen atom, a substituted or unsubstituted alkyl group, a substituted or unsubstituted alkoxyl group, hydroxyl group, or a halogen atom, and $R^4$ and $R^6$, and $R^5$ and $R^7$ may independently form a heterocyclic ring, which may have a substituent, in combination with a nitrogen atom and two carbon atoms bonded thereto;

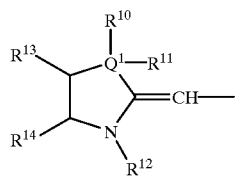

(IV)

wherein $Q^1$ is a carbon atom or a nitrogen atom; $R^{10}$ and $R^{11}$, which may be the same or different, are each a hydrogen atom, a substituted or unsubstituted alkyl group, a substituted or unsubstituted aryl group, a substituted or unsubstituted aralkyl group, or hydroxyl group, provided that $R^{11}$ does not exist when $Q^1$ represents a nitrogen atom; $R^{12}$ is a hydrogen atom, a substituted or unsubstituted alkyl group, a substituted or unsubstituted aryl group, or a substituted or unsubstituted aralkyl group; $R^{13}$ and $R^{14}$, which may be the same or different, are each a hydrogen atom, a substituted or unsubstituted alkyl group, an alkoxyl group, or a halogen atom, or $R^{13}$ and $R^{14}$ may form an alicyclic hydrocarbon ring, an aromatic ring which may have a substituent, or a heterocyclic ring which may have a substituent, in combination with two carbon atoms bonded thereto.

Alternatively, a compound represented by the following formula (V) is preferable as the squarylium compound for use in the present invention:

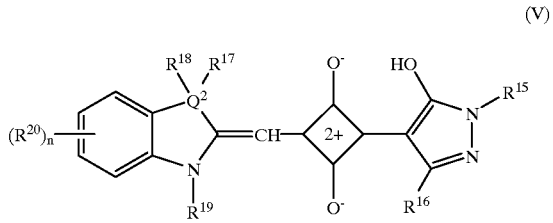

(V)

wherein Q is a carbon atom or a nitrogen atom; $R^{15}$ is a hydrogen atom, a substituted or unsubstituted alkyl group, a substituted or unsubstituted aryl group, or a substituted or unsubstituted heterocyclic group; $R^{16}$ is a hydrogen atom, a halogen atom, a substituted or unsubstituted alkyl group, a substituted or unsubstituted alkoxyl group, a substituted or unsubstituted aralkyl group, a substituted or unsubstituted aryl group, a substituted or unsubstituted amino group, or a substituted or unsubstituted heterocyclic group; $R^{17}$ and $R^{18}$, which may be the same or different, are each a substituted or unsubstituted alkyl group, or when $Q^2$ is a carbon atom, $R^{17}$ and $R^{18}$ may form an alicyclic hydrocarbon ring or a heterocyclic ring in combination with the carbon atom represented by $Q^2$, whereas when $Q^2$ is a nitrogen atom, $R^{18}$ does not exist; $R^{19}$ is a hydrogen atom, a substituted or unsubstituted alkyl group, a substituted or unsubstituted aralkyl group, or a substituted or unsubstituted aryl group; $R^{20}$ is a halogen atom, a substituted or unsubstituted alkyl group, a substituted or unsubstituted aralkyl group, a substituted or unsubstituted aryl group, trifluoromethyl group, nitro group, cyano group, or a substituted or unsubstituted alkoxyl group; and n is an integer of 0 to 4, provided that when n is an integer of 2 to 4, a plurality of groups represented by $R^{20}$ may be the same or different, and in this case, adjacent groups represented by $R^{20}$ may form an aromatic ring, which may have a substituent, in combination with two carbon atoms bounded thereto.

In the recording layer, it is preferable that the amount ratio by weight of the squarylium compound to the azo metal chelate compound be in the range of (90:10) to (10:90), more preferably in the range of (80:20) to (15:85), and further preferably in the range of (80:20) to (30:70).

When the amount ratio of the squarylium compound is within the above-mentioned range, the azo metal chelate compound can effectively work to obtain high light resistance. Further, when the amount ratio of the squarylium compound is within the above-mentioned range, high reflectance can be obtained.

As previously mentioned, the azo metal chelate compound for use in the present invention comprises an azo moiety of formula (I-1) and a metal:

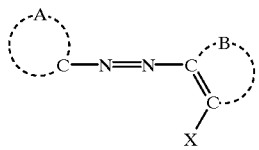

(I-1)

wherein A and B are each independently a residue for forming an aromatic ring which may have a substituent or a heterocyclic ring which may have a substituent in combination with one or two carbon atoms bounded thereto; and X represents a substituent having an active hydrogen group.

Specific examples of the residues represented by A and B in formula (I-1) include residues that can form a benzene ring, a naphthalene ring, a pyridine ring, and a quinoline ring.

These aromatic rings or heterocyclic rings may have a substituent. Examples of such a substituent include a halogen atom, nitro group, cyano atom, hydroxyl group, carboxyl group, amino group, carbamoyl group, mercapto group, a substituted or unsubstituted alkyl group, a substituted or unsubstituted aryl group, a residue of a substituted or unsubstituted heterocyclic group, a substituted or unsubstituted alkoxyl group, a substituted or unsubstituted aryloxy group, a substituted or unsubstituted alkylthio group, a substituted or unsubstituted arylthio group, a substituted or unsubstituted alkylamino group, a substituted or unsubstituted arylamino group, a substituted or unsubstituted alkoxycarbonyl group, a substituted or unsubstituted aryloxycarbonyl group, a substituted or unsubstituted alkylcarboxamide group, a substituted or unsubstituted arylcarboxamide group, a substituted or unsubstituted alkylcarbamoyl group, a substituted or unsubstituted arylcarbamoyl group, a substituted or unsubstituted alkenyl group, and a substituted or unsubstituted alkylsulfamoyl group.

Further, in the recording layer of the optical recording medium, the azo metal chelate compound comprising an azo moiety of formula (I-2) and a metal is employed:

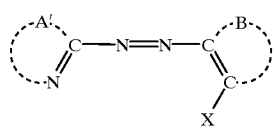

(I-2)

wherein A' is a residue for forming a heterocyclic ring in combination with a carbon atom and a nitrogen atom bonded thereto; B is a residue for forming an aromatic ring or a heterocyclic ring in combination with two carbon atoms bonded thereto; and X represents a substituent having an active hydrogen group.

Specific examples of the residue represented by A' in formula (I-2) include residues that can form thiazole ring, benzothiazole ring, imidazole ring, benzimidazole ring, thiadiazole ring, oxazole ring, benzoxazole ring, triazole ring, pyrazole ring, oxadiazole ring, pyridine ring, pyridazine ring, pyrimidine ring, pyrazine ring, triazine ring, and quinoline ring.

Such nitrogen-containing heterocyclic rings may have a substituent. Examples of such a substituent include a halogen atom, nitro group, cyano group, hydroxyl group, carboxyl group, amino group, carbamoyl group, a substituted or unsubstituted alkyl group, a substituted or unsubstituted aryl group, a residue of a substituted or unsubstituted heterocyclic ring, a substituted or unsubstituted alkoxyl group, a substituted or unsubstituted aryloxy group, a substituted or unsubstituted alkylthio group, a substituted or unsubstituted arylthio group, a substituted or unsubstituted alkylamino group, a substituted or unsubstituted arylamino group, a substituted or unsubstituted alkoxycarbonyl group, a substituted or unsubstituted aryloxycarbonyl group, a substituted or unsubstituted alkylcarboxamide group, a substituted or unsubstituted arylcarboxamide group, a substituted or unsubstituted alkylcarbamoyl group, a substituted or unsubstituted arylcarbamoyl group, and a substituted or unsubstituted alkenyl group.

Specific examples of the residue represented by B in formula (I-2) are the same as those in formula (I-1), that is, residues for forming benzene ring, naphthalene ring, pyridine ring, and quinoline ring. The residue represented by B in formula (I-2) may have a substituent. The substituent may be selected from the above-mentioned specific examples of the substituent for the residue represented by A' in formula (I-2).

In the description of the above-mentioned formulas (I-1) and (I-2), it is proper that the alkyl group be a straight-chain or branched alkyl group having 1 to 9 carbon atoms, or a cyclic alkyl group having 3 to 14 carbon atoms.

Specific examples of such alkyl groups include straight-chain alkyl groups such as methyl group, ethyl group, n-propyl group, n-butyl group, n-pentyl group, n-hexyl group, n-heptyl group, n-octyl group, n-nonyl group, and n-decyl group; branched alkyl groups such as isobutyl group, isoamyl group, 2-methylbutyl group, 2-methylpentyl group, 3-methylpentyl group, 4-methylpentyl group, 2-ethylbutyl group, 2-methylhexyl group, 3-methylhexyl group, 4-methylhexyl group, 5-methylhexyl group, 2-ethylpentyl group, 3-ethylpentyl group, 2-methylheptyl group, 3-methylheptyl group, 4-methylheptyl group, 5-methylheptyl group, 2-ethylhexyl group, 3-ethylhexyl group, isopropyl group, sec-butyl group, 1-ethylpropyl group, 1-methylbutyl group, 1,2-dimethylpropyl group, 1-methylheptyl group, 1-ethylbutyl group, 1,3-dimethylbutyl group, 1,2-dimethylbutyl group, 1-ethyl-2-methylpropyl group, 1-methylhexyl group, 1-ethylheptyl group, 1-propylbutyl group, 1-isopropyl-2-methylpropyl group, 1-ethyl-2-methylbutyl group, 1-propyl-2-methylpropyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-propylhexyl group, 1-isobutyl-3-methylbutyl group, neopentyl group, tert-butyl group, tert-hexyl group, tert-amyl group, and tert-octyl group; and cycloalkyl groups such as cyclohexyl group, 4-methylcyclohexyl group, 4-ethylcyclohexyl group, 4-tert-butylcyclohexyl group, 4-(2-ethylhexyl)cyclohexyl group, bornyl group, and isobornyl group (adamantyl group).

The above-mentioned alkyl groups may have a substituent such as hydroxyl group, a halogen atom, nitro group, carboxyl group, cyano group, a substituted or unsubstituted aryl group, or a residue of a substituted or unsubstituted heterocyclic ring. Further, the alkyl group may have as a substituent the above-mentioned alkyl or aryl group via an oxygen atom, sulfur atom, or nitrogen atom.

Examples of the substituent group constituted of an alkyl group and an oxygen atom include methoxymethyl group, methoxyethyl group, ethoxymethyl group, ethoxyethyl group, butoxyethyl group, ethoxyethoxyethyl group, phenoxyethyl group, methoxypropyl group, and ethoxypropyl group.

Examples of the substituent group constituted of an alkyl group and a sulfur atom include methylthioethyl group, ethylthioethyl group, ethylthiopropyl group, and phenylthioethyl group.

Examples of the substituent group constituted of an alkyl group and a nitrogen atom include dimethylaminoethyl group, diethylaminoethyl group, and diethylaminopropyl group.

Examples of the aryl group include phenyl group, naphthyl group, anthranyl group, fluorenyl group, phenalenyl group, phenanthryl group, triphenylenyl group, and pyrenyl group.

The above-mentioned aryl group may have a substituent such as hydroxyl group, a halogen atom, nitro group, carboxyl group, cyano group, a substitute or unsubstituted aryl group, or a residue of a substituted or unsubstituted heterocyclic ring.

Further, the aryl group may have any of the above-mentioned alkyl groups as a substituent. In this case, the alkyl group may be bonded to the aryl group directly or via an oxygen atom, sulfur atom, or nitrogen atom.

Specific examples of the residue of the heterocyclic ring include furyl group, thienyl group, pyrrolyl group, benzofuryl group, isobenzofuranyl group, benzothienyl group, indolinyl group, isoindolinyl group, carbazolyl group, pyridyl group, piperidyl group, quinolyl group, isoquinolyl group, oxazolyl group, isooxazolyl group, thiazolyl group, isothiazolyl group, imidazolyl group, pyrazolyl group, benzimidazolyl group, pyrazyl group, pyrimidinyl group, pyridazinyl group, and quinoxalinyl group.

The above-mentioned residue of the heterocyclic ring may have a substituent such as hydroxyl group, a halogen atom, nitro group, carboxyl group, cyano group, a substituted or unsubstituted aryl group, or a residue of a substituted or unsubstituted heterocyclic ring. Further, the residue of the heterocyclic ring may have as a substituent any of the above-mentioned alkyl groups via an oxygen atom, sulfur atom, or nitrogen atom.

Specific examples of the halogen atom include fluorine atom, chlorine atom, bromine atom, and iodine atom.

With respect to the alkoxyl group, any groups where the above-mentioned substituted or unsubstituted alkyl group is directly bonded to an oxygen atom are employed.

With respect to the aryloxyl group, any groups where the above-mentioned substituted or unsubstituted aryl group is directly bonded to an oxygen atom are employed.

With respect to the alkylthio group, any groups where the above-mentioned substituted or unsubstituted alkyl group is directly bonded to a sulfur atom are employed.

With respect to the arylthio group, any groups where the above-mentioned substituted or unsubstituted aryl group is directly bonded to a sulfur atom are employed.

With respect to the alkylamino group, any groups where the above-mentioned substituted or unsubstituted alkyl group is directly bonded to a nitrogen atom are employed. In this case, alkyl groups may be bonded together with an oxygen atom and a nitrogen atom to form a ring such as piperidino group, morpholino group, pyrrolidinyl group, piperazinyl group, indolinyl group, or isoindolinyl group.

With respect to the arylamino group, any groups where the above-mentioned substituted or unsubstituted aryl group is directly bonded to a nitrogen atom are employed.

With respect to the alkoxycarbonyl group, any groups where the above-mentioned substituted or unsubstituted alkyl group is directly bonded to an oxygen atom of a C=O linkage are employed.

With respect to the aryloxycarbonyl group, any groups where the above-mentioned substituted or unsubstituted aryl group is directly bonded to an oxygen atom of a C=O linkage are employed.

With respect to the alkylcarboxamide group, any groups where the above-mentioned substituted or unsubstituted alkyl group is directly bonded to a carbon atom of carboxamide are employed.

With respect to the arylcarboxamide group, any groups where the above-mentioned substituted or unsubstituted aryl group is directly bonded to a carbon atom of carboxamide are employed.

With respect to the alkylcarbamoyl group, any groups where the above-mentioned substituted or unsubstituted alkyl group is directly bonded to a nitrogen atom of carbamoyl group are employed. In this case, alkyl groups may be bonded together with an oxygen atom and a nitrogen atom to form a ring such as piperidino group, morpholino group, pyrrolidinyl group, piperazinyl group, indolinyl group, or isoindolinyl group.

With respect to the arylcarbamoyl group, any groups where the above-mentioned substituted or unsubstituted aryl group is directly bonded to a nitrogen atom of carbamoyl group are employed.

With respect to the alkylsulfamoyl group, any groups where the above-mentioned substituted or unsubstituted alkyl group is directly bonded to a nitrogen atom of sulfamoyl group are employed.

Specific examples of the substituent represented by X having an active hydrogen group are hydroxyl group, carboxyl group, amino group, an alkylcarboxamide group, an arylcarboxamide group, an alkylsulfonamide group, an arylsulfonamide group, carbamoyl group, an alkylcarbamoyl group, an arylcarbamoyl group, sulfo group, sulfino group, sulfeno group, sulfamoyl group, and thiol group.

With respect to the alkylcarboxamide group, arylcarboxamide group, alkylcarbamoyl group, and arylcarbamoyl group serving as the substituents having an active hydrogen group, the same specific examples as mentioned above can be used.

With respect to the alkylsulfonamide group, any groups where the above-mentioned substituted or unsubstituted alkyl group is directly bonded to a sulfur atom of sulfonamide are employed.

With respect to the arylsulfonamide group, any groups where the above-mentioned substituted or unsubstituted aryl group is directly bonded to a sulfur atom of sulfonamide are employed.

As a metal atom for use in the azo metal chelate compound, aluminum, titanium, vanadium, chromium, manganese, iron, cobalt, nickel, copper, zinc, zirconium, niobium, molybdenum, technetium, ruthenium, rhodium, and palladium can be employed. In particular, an azo metal chelate compound having a metal such as manganese, cobalt, nickel, or copper exhibits excellent optical properties when used as an optical recording material.

When recording and reading operations are carried out using the optical recording medium of the present invention, laser beams with wavelengths of 600 to 720 nm are preferably employed. In consideration of the optical properties throughout the above-mentioned wavelength region from 600 to 720 nm, a squarylium compound of formula (II) or (V) are particularly preferable in the present invention.

The previously mentioned formulas (II) to (V) will now be explained in detail.

In the definition of the groups cited in formulas (II) to (V), a straight-chain or branched alkyl group having 1 to 6 carbon atoms, or a cyclic alkyl group having 3 to 8 carbon atoms can be employed as the alkyl group and an alkyl moiety of the alkoxyl group.

Specific examples of such alkyl groups include methyl group, ethyl group, propyl group, isopropyl group, butyl group, iso-butyl group, sec-butyl group, tert-butyl group, pentyl group, isopentyl group, 1-methylbutyl group, 2-methylbutyl group, tert-pentyl group, hexyl group, cyclopropyl group, cyclobutyl group, cyclopentyl group, cyclohexyl group, cycloheptyl group, and cyclooctyl group.

Examples of the aryl group and an aryl moiety of the aralkyl group include phenyl group, naphthyl group, and anthryl group.

As the aralkyl group, there can be used aralkyl groups having 7 to 15 carbon atoms, such as benzyl group, phenethyl group, phenylpropyl group, naphthylmethyl group, and benzhydryl group.

Examples of the halogen atom include fluorine atom, chlorine atom, bromine atom, and iodine atom.

As the heterocyclic ring in the heterocyclic group and the heterocyclic ring formed together by $R^{13}$ and $R^{14}$ or $R^{17}$ and $R^{18}$ with two or one carbon atom bonded thereto, there are an aromatic heterocyclic ring and an alicyclic heterocyclic ring.

As the aromatic heterocyclic ring for use in the present invention, there are a 5- or 6-membered monocyclic aromatic heterocyclic ring including at least one atom selected from the group consisting of a nitrogen atom, an oxygen atom, and a sulfur atom; and a bicyclic or tricyclic condensed aromatic heterocyclic ring having at least one atom selected from the group consisting of a nitrogen atom, an oxygen atom, and a sulfur atom, prepared by condensation of a 3- to 8-membered ring.

Specific examples of the aromatic heterocyclic ring include pyridine ring, pyrazine ring, pyrimidine ring, pyridazine ring, quinoline ring, isoquinoline ring, phthalazine ring, quinazoline ring, quinoxaline ring, naphthyridine ring, cinnnoline ring, pyrrole ring, pyrazole ring, imidazole ring, triazole ring, tetrazole ring, thiophene ring, furan ring, thiazole ring, oxazole ring, indole ring, isoindole ring, indazole ring, benzimidazole ring, benzotriazole ring, benzothiazole ring, benzoxazole ring, purine ring, and carbazole ring.

As the alicyclic heterocyclic ring for use in the present invention, there are a 5- or 6-membered monocyclic alicyclic heterocyclic ring including at least one atom selected from a nitrogen atom, an oxygen atom, and a sulfur atom; and a bicyclic or tricyclic condensed alicyclic heterocyclic ring having at least one atom selected from a nitrogen atom, an oxygen atom, and a sulfur atom prepared by condensation of a 3- to 8-membered ring.

Specific examples of the alicyclic heterocyclic ring include pyrrolidine ring, piperidine ring, piperazine ring, morpholine ring, thiomorpholine ring, homopiperidine ring, homopiperazine ring, tetrahydropyridine ring, tetrahydroquinoline ring, tetrahydroisoquinoline ring, tetrahydrofuran ring, tetrahydropyran ring, dihydrobenzofuran ring, and tetrahydrocarbazole ring.

In formulas (II) and (III), $R^1$ and $R^2$ or $R^4$ and $R^5$ may independently form a heterocyclic ring together with a nitrogen atom bonded thereto, and in formula (III), when $R^4$ and $R^6$ or $R^5$ and $R^7$ may independently form a heterocyclic ring together with a N—C—C linkage. In this case, a nitrogen-containing aromatic heterocyclic ring and a nitrogen-containing alicyclic heterocyclic ring are formed.

As the nitrogen-containing aromatic heterocyclic ring, there are a 5- or 6-membered monocyclic aromatic heterocyclic ring including at least one nitrogen atom; and a bicyclic or tricyclic condensed aromatic heterocyclic ring having at least one nitrogen atom, prepared by condensation of a 3- to 8-membered ring.

Specific examples of such a nitrogen-containing aromatic heterocyclic ring include pyridine ring, pyrazine ring, pyrimidine ring, pyridazine ring, quinoline ring, isoquinoline ring, phthalazine ring, quinazoline ring, quinoxaline ring, naphthyridine ring, cinnnoline ring, pyrrole ring, pyrazole ring, imidazole ring, triazole ring, tetrazole ring, thiazole ring, oxazole ring, indole ring, isoindole ring, indazole ring, benzimidazole ring, benzotriazole ring, benzothiazole ring, benzoxazole ring, purine ring, and carbazole ring.

As the nitrogen-containing alicyclic heterocyclic ring, there are a 5- or 6-membered monocyclic alicyclic heterocyclic ring including at least one nitrogen atom; and a condensed alicyclic heterocyclic ring having at least one nitrogen atom, prepared by condensation of a 3-to 8-membered ring.

Specific examples of such a nitrogen-containing alicyclic heterocyclic ring include pyrrolidine ring, piperidine ring, piperazine ring, morpholine ring, thiomorpholine ring, homopiperidine ring, homopiperazine ring, tetrahydropyridine ring, tetrahydroquinoline ring, tetrahydroisoquinoline ring, and tetrahydrocarbazole ring.

As the alicyclic hydrocarbon ring formed by $R^{13}$ and $R^{14}$ or $R^{17}$ and $R^{18}$ together with two or one carbon atom bonded thereto, alicyclic hydrocarbon rings having 3 to 8 carbon atoms, which may be saturated or unsaturated, can be employed.

Examples of such an alicyclic hydrocarbon ring having 3 to 8 carbon atoms include cyclopropane ring, cyclobutane ring, cyclopentane ring, cyclohexane ring, cycloheptane ring, cyclooctane ring, cyclopentene ring, 1,3-cyclopentadiene ring, cyclohexene ring, and cyclohexadiene ring.

As the aromatic ring formed by $R^{13}$ and $R^{14}$ together with two carbon atoms bonded thereto, aromatic rings having 6 to 14 carbon atoms, such as benzene ring, naphthalene ring, and anthracene ring can be employed.

The previously mentioned aryl group, aralkyl group, heterocyclic group, aromatic ring, nitrogen-containing heterocyclic ring, or heterocyclic ring may have a substituent. In this case, the number of substituents for each group is from one to the permissible number, preferably, 1 to 5, and the substituents may be the same or different. Examples of the substituents are hydroxyl group; carboxyl group; nitro group; an alkoxyl group; an alkyl group; an aralkyl group; cyano group; a halogen atom; —N=N—Ar group where Ar represents hydroxyl group, carboxyl group, nitro group, an alkoxyl group, an alkyl group having a halogen substituent, or an aryl group having a halogen substituent or cyano substituent; and —CH=CH—Ar where Ar is the same as that previously defined. In the above, the alkyl group, alkoxyl group, aralkyl group, aryl group, and halogen atom are the same as those previously defined.

The number of substituents for the alkyl group or alkoxyl group is from one to the permissible number, preferably, from 1 to 3. When an alkyl group or alkoxyl group has two or more substituents, the substituents may be the same or different. Examples of the substituents for the alkyl group or alkoxyl group are hydroxyl group, carboxyl group, nitro group, an alkoxyl group, an aryl group, and a halogen atom. In the above, the alkoxyl group, aralkyl group, aryl group and halogen atom are the same as those previously defined.

The amino group may have one or two substituents. When an amino group has two substituents, the substituents may be the same or different, and, for example, an alkyl group and an aryl group can be used as the substituents.

The method of preparing the squarylium compound of formula (II) or (V) will now be explained in detail.

The squarylium compound of formula (II) can be prepared in accordance with the following reaction schemes (1-a) to (1-c):

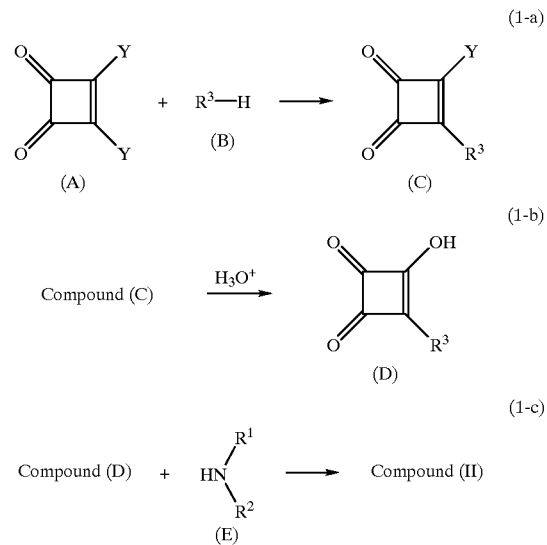

In the reaction scheme (1-a), a compound (A) is allowed to react with a compound (B) in a solvent, in the presence of a base when necessary, at room temperature for 1 to 4 hours, thereby obtaining a compound (C). The amounts of the compound (B) and the base are 0.4 to 2 times the amount of the compound (A) in terms of molar amounts.

Examples of the above-mentioned solvent are chloroform, dichloromethane, 1,2-dichloroethane, ethyl acetate, diethyl ether, methyl-tert-butyl ether, tetrahydrofuran, toluene, benzene, dimethylformamide, and dimethyl sulfoxide.

Examples of the base include organic bases such as quinoline, triethylamine, and pyridine; and inorganic bases such as potassium hydrogencarbonate and sodium hydrogencarbonate.

In the reaction scheme (1-b), the compound (C) is placed in an aqueous solution of acetic acid in a concentration of 50 to 90% by volume at 90 to 110° C. to cause a reaction for 1 to 7 hours. Alternatively, the compound (C) is placed in an aqueous solution of trifluoroacetic acid in a concentration of 50 to 99 wt. % or concentrated sulfuric acid at 40 to 60° C. to cause a reaction for 1 to 3 hours. Thus, a compound (D) can be obtained.

In the reaction scheme (1-c), the compound (D) is allowed to react with a compound (E) in an amount of 0.5 to 2 times the molar amount of the compound (D), in the presence of a base in an amount of 1.0 to 2.0 times the molar amount of the compound (D) when necessary. The reaction is carried out at 80 to 120° C. for 1 to 15 hours. Thus, a compound of formula (II) can be obtained.

The above-mentioned reaction represented by the reaction scheme (1-c) is carried out in an alcohol solvent having 2 to 8 carbon atoms such as ethanol, propanol, isopropanol, butanol, or octanol, or a mixed solvent of the above-mentioned alcohol solvent and benzene or toluene (in a mixing ratio by volume of 50:50).

Examples of the base used in the reaction scheme (1-c) include organic bases such as quinoline, triethylamine, and pyridine; and inorganic bases such as potassium carbonate, potassium hydrogencarbonate, and sodium hydrogencarbonate.

Alternatively, the squarylium compound (II) for use in the present invention can also be prepared in accordance with the following reaction schemes (2-a) through (2-c):

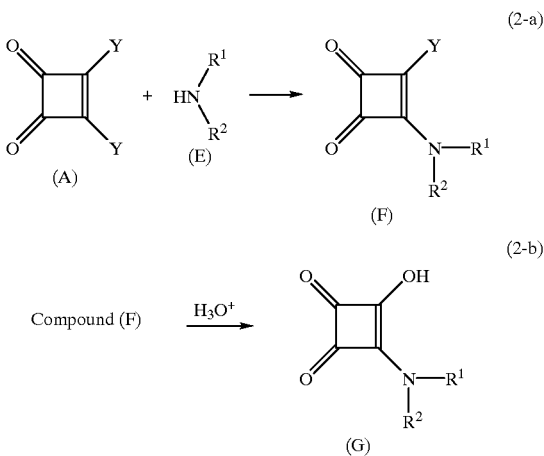

(2-a)

(2-b)

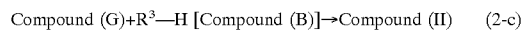

Compound (G)+R³—H [Compound (B)]→Compound (II)　(2-c)

In the above-mentioned reaction represented by the reaction scheme (2-a), a compound (F) can be obtained in the same manner as in the reaction scheme (1-a) except that the compound (B) is replaced by the compound (E).

In the above-mentioned reaction represented by the reaction scheme (2-b), a compound (G) can be obtained in the same manner as in the reaction scheme (1-b) except that the compound (C) is replaced by the compound (F).

In the reaction scheme (2-c), the procedure for preparation of the squarylium compound (II) as in the reaction scheme (1-c) is repeated except that the compound (D) is replaced by the compound (G) and the compound (E) is replaced by the compound (B).

After completion of the final step as in the reaction scheme (1-c) or (2-c), a solvent is distilled away from the reaction product or the reaction product is subjected to filtration. Further, the compound (II) can be isolated from the reaction product by any purification methods commonly employed in the field of organic synthetic chemistry, for example, column chromatography, recrystallization, and washing by use of a solvent.

In the reaction schemes (1-a) to (1-c) and (2-a) to (2-c), $R^1$, $R^2$, and $R^3$ are the same as those previously defined; and Y is a halogen atom such as chlorine or bromine, or $OR^{21}$ in which $R^{21}$ represents the same alkyl group as defined in the description of formulas (II) to (V).

The squarylium compound (V) that is preferably used in the recording layer can be prepared in accordance with the following reaction schemes (3-a) to (3-c):

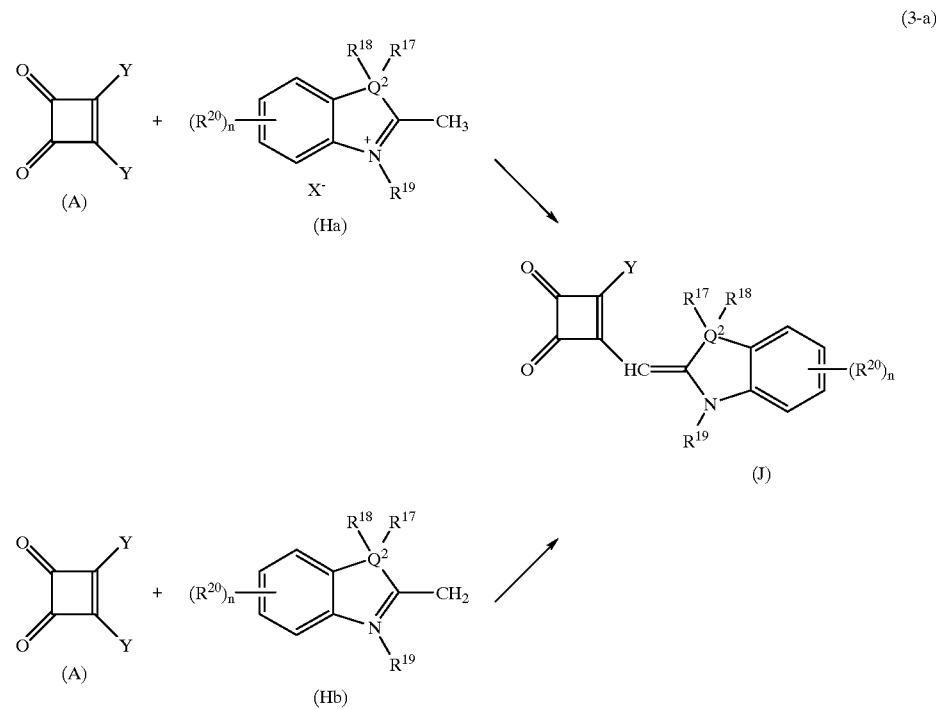

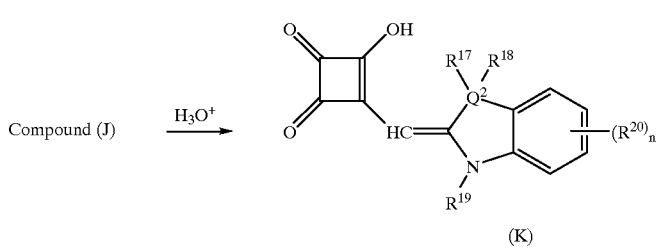

(K)

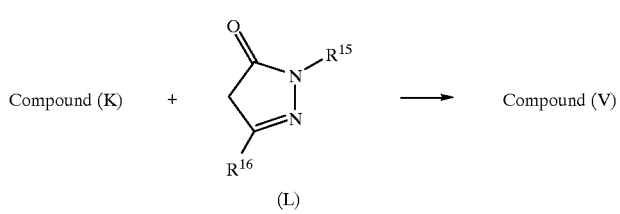

(L)

In the reaction scheme (3-a), a compound (A) is allowed to react with a compound (Ha) or (Hb) in a solvent, in the presence of a base when necessary, at temperatures between 0° C. and room temperature for 30 minutes to 70 hours, thereby obtaining a compound (J). The compound (Ha) or (Hb) and the base are used from in an amount equimolar, to in an amount of two times the amount of the compound (A) in terms of molar amount.

Examples of the above-mentioned solvent are chloroform, dichloromethane, 1,2-dichloroethane, ethyl acetate, diethyl ether, methyl-tert-butyl ether, tetrahydrofuran, toluene, benzene, dimethylformamide, and dimethyl sulfoxide.

Examples of the base include organic bases such as quinoline, triethylamine, and pyridine; and inorganic bases such as potassium hydrogencarbonate and sodium hydrogencarbonate.

In the reaction scheme (3-b), the compound (J) is placed in an aqueous solution of acetic acid in a concentration of 50 to 90% by volume at 90 to 110° C. to cause a reaction for 1 to 7 hours. Alternatively, the compound (J) is placed in an aqueous solution of trifluoroacetic acid in a concentration of 50 to 99 wt. % at 45 to 50° C. to cause a reaction for 1 to 3 hours. Thus, a compound (K) can be obtained.

In the reaction scheme (3-c), the compound (K) is allowed to react with a compound (L) in an amount of 0.5 to 2 times the molar amount of the compound (K), in the presence of a base in an amount of 0.5 to 2 times the molar amount of the compound (K) when necessary. The reaction is carried out at 80 to 120° C. for 1 to 15 hours. Thus, a compound of formula (V) can be obtained.

The above-mentioned reaction represented by the reaction scheme (3-c) is carried out in an alcohol solvent having 2 to 8 carbon atoms such as ethanol, propanol, isopropanol, butanol, or octanol, or a mixed solvent of the above-mentioned alcohol solvent and benzene or toluene (in a mixing ratio by volume of 50:50).

Examples of the base used in the reaction scheme (3-c) include organic bases such as quinoline, triethylamine, and pyridine; and inorganic bases such as potassium carbonate, potassium hydrogencarbonate, and sodium hydrogencarbonate.

Alternatively, the squarylium compound (V) for use in the present invention can also be prepared in accordance with the following reaction schemes (4-a) through (4-c):

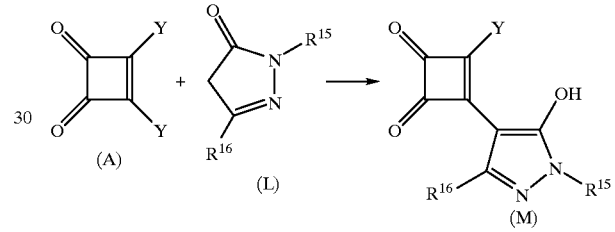

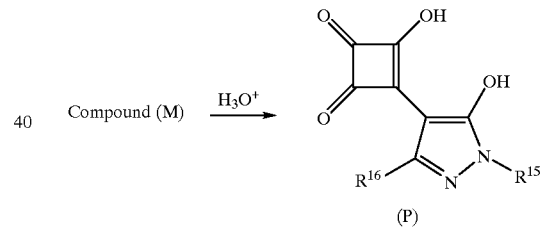

Compound (P)+Compound (Ha) or (Hb)→Compound (V)  (4-c)

In the above-mentioned reaction represented by the reaction scheme (4-a), a compound (M) can be obtained in the same manner as in the reaction scheme (3-a) except that the compound (Ha) or (Hb) is replaced by a compound (L).

In the above-mentioned reaction represented by the reaction scheme (4-b), a compound (P) can be obtained in the same manner as in the reaction scheme (3-b) except that the compound (J) is replaced by the compound (M).

In the reaction scheme (4-c), the procedure for preparation of the squarylium compound (V) as in the reaction scheme (3-c) is repeated except that the compound (K) is replaced by the compound (P) and the compound (L) is replaced by the compound (Ha) or (Hb).

After completion of the final step as in the reaction scheme (3-c) or (4-c), a solvent is distilled away from the reaction product or the reaction product is subjected to filtration. Further, the compound (V) can be isolated from the reaction product by any purification methods commonly employed in the field of organic synthetic chemistry, for example, column chromatography, recrystallization, and washing by use of a solvent.

In the reaction schemes (3-a) to (3-c) and (4-a) to (4-c), $R^{15}, R^{16}, R^{17}, R^{18}, R^{19}, R^{20}, Q^2$, and n are the same as those previously defined; X is a halogen atom such as chlorine, bromine, or iodine, tosyl group, or mesyl group; and Y is the same as that previously defined.

From the viewpoint of the optical characteristics, the recording layer for use in the optical recording medium of the present invention may exhibit a great absorption band shorter than a wavelength region of 630–670 nm, but the longer wavelength side of the absorption band is adjacent to the wavelength of light used for recording and reading. In other words, it is preferable that the recording layer have a large refractive index and a large extinction coefficient with respect to light with wavelengths of 630 to 670 nm currently used for recording and reading.

More specifically, it is preferable that the recording layer as a single layer have a refractive index (n) of 1.5 to 3.0, and the extinction coefficient (k) of 0.02 to 0.3, with respect to the wavelength region±5 nm of the predetermined light for recording and reading. When the refractive index (n) is 1.5 or more, it is possible to obtain a sufficient optical change, so that the degree of recording modulation can be enhanced. When the refractive index (n) is 3.0 or less, the dependence on the wavelength can be decreased, and occurrence of errors can be minimized within the wavelength range of the recording and reading light. Further, when the extinction coefficient (k) of the recording layer is 0.02 or more, recording sensitivity can be improved, and at the same time, when the coefficient (k) is 0.3 or less, the reflectance of 50% or more can be easily obtained.

The substrate of the optical recording medium according to the present invention may have a guide groove with a depth of 1000 to 2500 Å. When the recording medium is required to have a large capacity, the track pitch of the guide groove is preferably 0.7 to 0.8 μm, although the track pitch is usually set at 0.7 to 1.0 μm. With respect to the guide width, it is preferable that the half width of the guide groove be in the range of 0.18 to 0.40 μm. When the half width is 0.18 μm or more, the intensity of tracking error signals can become sufficiently large. When the half width is 0.40 μm or less, a recorded portion can be prevented from spreading in the width direction of the guide groove.

When the optical recording medium of the present invention is used as a DVD-R, it is preferable that writing and reading of information be carried out by the application of semiconductor laser beams with wavelengths of 600 to 720 nm. In other words, the recording and reading method of the present invention comprises the steps of recording information in the optical recording medium of the present invention by applying thereto a semiconductor laser beam with a wavelength in the range of 600 to 720 nm, and reading the information from the recording medium by applying thereto a semiconductor laser beam with a wavelength in the range of 600 to 720 nm.

The structure of the optical recording medium according to the present invention will now be explained in detail.

FIG. 1A to FIG. 1D are schematic cross sectional views, each showing an embodiment of the optical recording medium suitable for a WORM type optical disk.

Figure 1B:
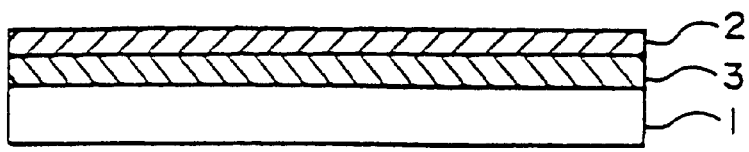
Figure 1C:
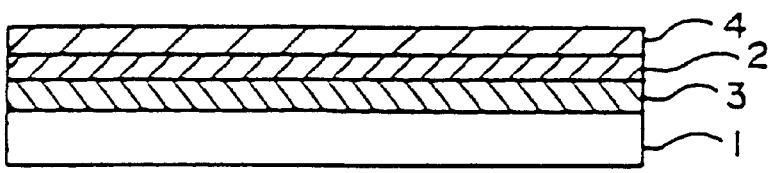
Figure 1D:
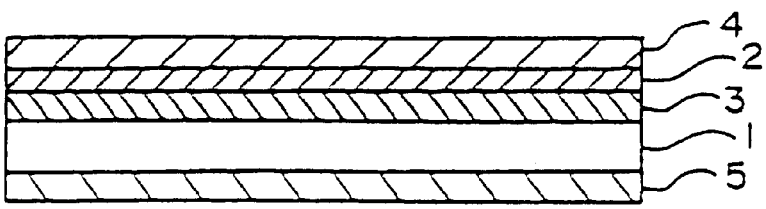

As shown in FIG. 1A, a recording layer 2 is overlaid on a substrate 1. The recording layer 2 may be provided on the substrate 1 via an undercoat layer 3 as shown in FIG. 1B; and a protective layer 4 may be further overlaid on the recording layer 2 as shown in FIG. 1C. In FIG. 1D, a hard coat layer 5 is further provided on the back side of the substrate 1, opposite to the undercoat layer side with respect to the substrate 1.

Figure 2A:
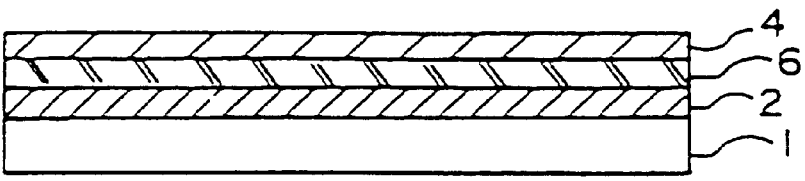
FIG. 2A to FIG. 2C are schematic cross sectional views of optical recording media according to the present invention, each showing the structure of a CD-R with a high reflectance.
Figure 2B:
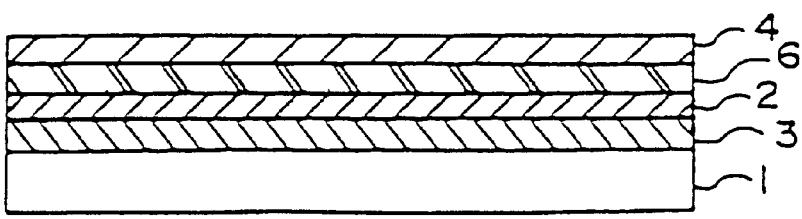
Figure 2C:
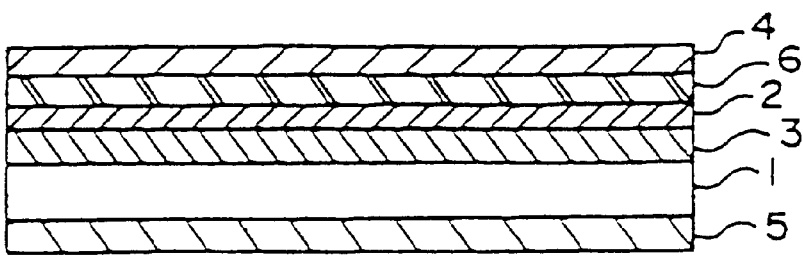

FIG. 2A to FIG. 2C are schematic cross sectional views, each showing an embodiment of the optical recording medium suitable for a CD-R. In such embodiments of FIG. 2A to FIG. 2C, a light reflection layer 6 is provided on the recording layer 2.

More specifically, a recording medium of the present invention shown in FIG. 2A comprises a substrate 1, and a recording layer 2, a reflection layer 6, and a protective layer 4 which are successively overlaid on the substrate 1 in this order.

A recording medium of the present invention shown in FIG. 2B is the same as that in FIG. 2A except that an undercoat layer 3 is interposed between the substrate 1 and the recording layer 2.

A recording medium of the present invention shown in FIG. 2C is the same as that in FIG. 2B except that a hard coat layer 5 is provided on the back side of the substrate 1, opposite to the side of the undercoat layer 3 with respect to the substrate 1.

Figure 3A:
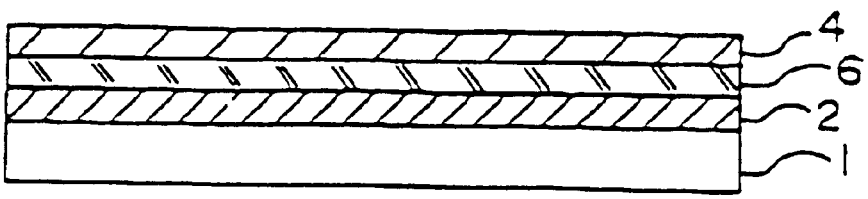
FIG. 3A to FIG. 3C are schematic cross sectional views of optical recording media according to the present invention, each showing the structure of a DVD-R with a large capacity and a high reflectance.
Figure 3B:
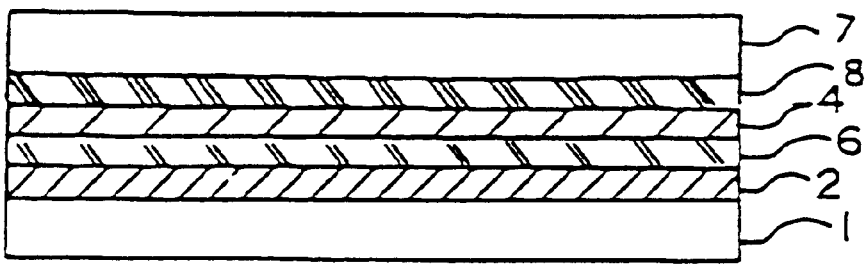
Figure 3C:
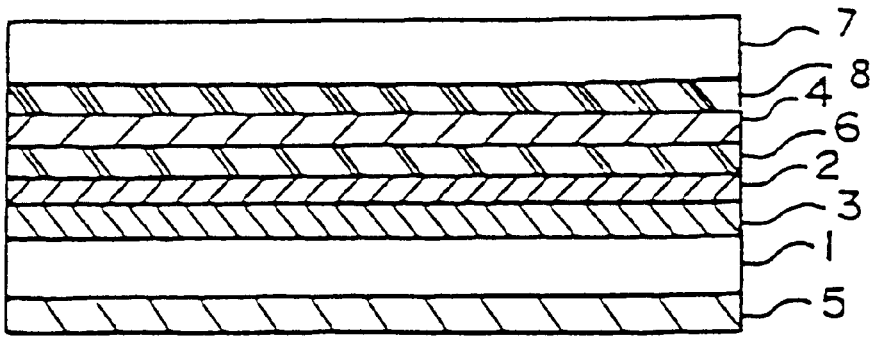

FIG. 3A to FIG. 3C are schematic cross sectional views showing the structure of the optical recording medium according to the present invention, which can be used as a recording medium for a DVD-R.

A recording medium shown in FIG. 3A is the same as that shown in FIG. 2A in terms of the structure.

A recording medium shown in FIG. 3B is the same as that in FIG. 2A except that a protective substrate 7 is attached to the protective layer 4 with an adhesive layer 8.

A recording medium shown in FIG. 3C is the same as that in FIG. 2C except that a protective substrate 7 is attached to the protective layer 4 with an adhesive layer 8.

An optical recording medium of the present invention can also be constructed by superimposing any two of the above-mentioned recording media as illustrated in FIG. 1 and FIG. 2 in such a manner that the recording layers of the two recording media are positioned inside so as to face each other with another substrate and an air gap therebetween in a sealed air-sandwich structure, or by laminating the two recording media in the above-mentioned posture, but through the protective layer.

The basic structure of the recording medium suitable for a DVD-R is that a first substrate and a second substrate are attached with an adhesive in such a configuration that a recording layer is interposed between the first and second substrates. In this case, a metal reflection layer may be overlaid on the recording layer. Further, an undercoat layer may be interposed between the substrate and the recording layer, and a protective layer may be overlaid on the recording layer. A layered structure of a first substrate, a recording layer, a metal reflection layer, a protective layer, an adhesive layer, and a second substrate is very commonly employed.

Required properties or characteristics and materials for the substrate and each of the above-mentioned layers of the optical recording medium of the present invention will now be explained.

<Substrate>

When writing and reading is carried out on the substrate side, namely, a laser beam for writing or reading is applied to the substrate side, the substrate is required to be transparent to the employed laser beam. However, such transparency is unnecessary when writing and reading are carried out on the recording layer side.

Examples of the material for the substrate are plastic materials such as polyester, acrylic resin, polyamide, polycarbonate resin, polyolefin resin, phenolic resin, epoxy resin, and polyimide; glass; ceramics; and metals.

Guide grooves or guide pits for tracking may be formed on the surface of the substrate when the substrate is single in the recording medium, or the first substrate when two substrates are used in the sealed air-sandwich structure. Furthermore, pre-formats for address signals may also be formed on the surface of the substrate.

<Recording Layer>

Information is recorded in the recording layer by causing some optical changes in the recording layer when the recording layer is irradiated with a laser beam. According to the present invention, the recording layer comprises a dye mixture of the previously mentioned squarylium compound and azo metal chelate compound.

For the preparation of the recording layer, one kind of squarylium dye and one kind of azo metal chelate dye may be contained, or a plurality of squarylium compounds and a plurality of azo metal chelate compounds may be used in combination. In addition to the above-mentioned squarylium compound and azo metal chelate compound, any other organic dyes may be used in combination in the recording layer, or used in the form of a separate layer of a laminated structure in order to improve the optical characteristics, recording sensitivity, and signal properties.

Examples of such organic dyes are polymethine dye, naphthalocyanine dye, phthalocyanine dye, croconium dye, pyrylium dye, naphthoquinone dye, anthraquinone (indanthrene) dye, xanthene dye, triphenylmethane dye, azulene dye, tetrahydrocholine dye, phenanthrene dye, and triphenothiazine dye. Further, metal chelate compounds are usable. These compounds may be used alone or in combination.

Various metals and metal compounds may be mixed and dispersed in the above-mentioned dyes. The metals and metal compounds may form separate layers. Examples of the above-mentioned metals and metal compounds are In, Te, Bi, Se, Sb, Ge, Sn, Al, Be, $TeO_2$, SnO, As, and Cd.

In the above-mentioned dyes, various materials, for example, polymers such as ionomer resin, polyamide resin, vinyl resin, natural polymers, silicone, and liquid rubber, and a silane coupling agent may be dispersed.

Furthermore, in order to improve the characteristics of the recording layer, the above-mentioned dyes may also be employed in combination with other agents such as a stabilizer (for example, a transition metal complex), a dispersant, a fire retardant, a lubricant, an antistatic agent, a surfactant, and a plasticizer.

The recording layer can be formed by any of conventional methods such as deposition, sputtering, CVD, and solution coating.

For the solution coating, the above-mentioned dye compounds and other materials may be dissolved in an organic solvent to prepare a coating liquid, and the thus prepared coating liquid for recording layer may be coated on the substrate by any conventional coating methods such as spray coating, roller coating, dip coating, and spinner coating.

Specific examples of the organic solvent used in the preparation of the recording layer coating liquid are alcohols such as methanol, ethanol, and isopropanol; ketones such as acetone, methyl ethyl ketone, and cyclohexanone; amides such as N,N-dimethylformamide and N,N-dimethylacetamide; sulfoxides such as dimethyl sulfoxide; ethers such as tetrahydrofuran, dioxane, diethyl ether, and ethylene glycol monomethyl ether; esters such as methyl acetate and ethyl acetate; aliphatic halogenated hydrocarbons such as chloroform, methylene chloride, dichloroethane, carbon tetrachloride, and trichloroethane; aromatic solvents such as benzene, xylene, monochlorobenzene, and dichlorobenzene; Cellosolves such as methoxy ethanol and ethoxy ethanol; and hydrocarbons such as hexane, pentane, cyclohexane, and methylcyclohexane.

It is preferable that the recording layer for use in the optical recording medium of the present invention have a thickness in the range of 100 Å to 10 μm, more preferably in the range of 200 Å to 2000 Å.

<Undercoat Layer>

The undercoat layer may be interposed between the substrate and the recording layer for the following purposes: (a) improving the adhesion between the substrate and the recording layer; (b) serving as a barrier layer to prevent the recording layer from being exposed to water and gases; (c) improving the preservation stability of the recording layer; (d) increasing the reflectance of the recording layer; (e) protecting the substrate and the recording layer from solvents; and (f) forming guide grooves, guide pits, preformats, and the like.

To attain the above-mentioned purpose (a), a variety of polymeric materials such as ionomer resin, polyamide resin, vinyl resin, natural resins, natural polymeric materials, silicone, and liquid rubber; and a silane coupling agent may be employed for the formation of the undercoat layer. To attain the purposes (b) and (c), not only the above-mentioned polymeric materials, but also inorganic compounds such as $SiO_2$, $MgF_2$, SiO, $TiO_2$, ZnO, TiN, and SiN; and metals and semimetals such as Zn, Cu, Ni, Cr, Ge, Se, Au, Ag, and Al can be used. To attain the purpose (d), metals such as Al and Ag may be used for the formation of the undercoat layer. Alternatively, an organic thin film with a metallic luster may be formed using, for example, methine dye and xanthene dye. To attain the purposes (e) and (f), an ultraviolet-curing resin, a thermosetting resin, and a thermoplastic resin can be used for the formation of the undercoat layer.

It is preferable that the thickness of the undercoat layer be in the range of 0.01 to 30 μm, more preferably in the range of 0.05 to 10 μm.

<Reflection Layer>

The reflection layer for use in the present invention may be made of a metal or semimetal that can exhibit high reflectance by itself and is insusceptible to corrosion. Specific examples of the metal for use in the reflection layer are Au, Ag, Cr, Ni, Al, Fe, Sn, and Cu. Of these metals, Au, Ag, Al, and Cu are particularly preferable in view of the reflectance and the productivity. These metals and semimetals may be used alone, or in combination to prepare an alloy.

The reflection layer can be formed by the conventional film formation methods such as deposition and sputtering. It is preferable that the thickness of the reflection layer be in the range of 50 to 5000 Å, more preferably in the range of 100 to 3000 Å.

<Protective Layer and Hard Coat Layer>

The protective layer and the hard coat layer are provided to (a) protect the recording layer (or the reflection layer) from scratch, dust, and soiling, (b) improve the storage stability of the recording layer (or the reflection layer), and (c) improve the reflectance. For these purposes, the same materials as used for the undercoat layer are suitable. For instance, inorganic materials such as SiO and $SiO_2$; and organic materials such as heat-softening and heat-fusible resins, e.g. poly(methyl acrylate), polycarbonate, epoxy resin, polystyrene, polyester resin, vinyl resin, cellulose, aliphatic hydrocarbon resin, aromatic hydrocarbon resin, natural rubber, styrene-butadiene resin, chloroprene rubber, wax, alkyd resin, drying oil, and rosin, and ultraviolet-curing resins can be used. Of the above-mentioned materials for use in the protective layer and the hard coat layer, the ultraviolet-curing resin is particularly preferable in terms of productivity.

It is proper that the protective layer or the hard coat layer have a thickness of 0.01 to 30 μm, more preferably 0.05 to 10 μm.

The undercoat layer, the protective layer, and the hard coat layer may further comprise auxiliary agents such as a stabilizer, a dispersant, a fire retardant, a lubricant, an antistatic agent, a surfactant, and a plasticizer in the same manner as in the recording layer.

<Protective Substrate>

When the protective substrate is exposed to light for writing and reading, the protective substrate is required to be transparent to the employed laser beam. However, such transparency is unnecessary when the protective substrate serves only as a protection plate. The material for the protective substrate is the same as that for the above-mentioned substrate. For example, plastics such as polyester, acrylic resin, polyamide, polycarbonate resin, polyolefin resin, phenolic resin, epoxy resin, and polyimide; glass; ceramics; and metals can be used for the protective substrate.

<Adhesive Layer>

Any adhesive can be used so long as the two recording media can be attached to each other. In light of productivity, an ultraviolet-curing adhesive or hot-melt adhesive is preferable.

Other features of this invention will become apparent in the course of the following description of exemplary embodiments, which are given for illustration of the invention and are not intended to be limiting thereof.

EXAMPLE I-1

Fabrication of Optical Recording Medium No. I-1
(Formation of Recording Layer)

A guide groove with a depth of 1700 Å, a half width of 0.23 μm, and a track pitch of 0.74 μm was formed on one surface of a polycarbonate substrate with a thickness of 0.6 mm by injection molding. A mixture of an azo metal chelate compound A-3 (shown in TABLE 2) and a squarylium compound B-4 (shown in TABLE 3) in a mixing ratio by weight of 60:40, as shown in TABLE 1, was dissolved in 2,2,3,3-tetrafluoropropanol. The solution thus obtained was applied to the surface of the polycarbonate substrate by spinner coating, whereby a recording layer with a thickness of 900 Å was provided on the substrate.

(Formation of Reflection Layer)

A silver reflection layer with a thickness of 1300 Å was formed on the recording layer by sputtering.

(Formation of Protective Layer)

A protective layer with a thickness of 6 μm was provided on the reflection layer using an acrylic photopolymer.

Furthermore, another injection molded polycarbonate substrate with a thickness of 0.6 mm was attached to the above-mentioned protective layer with an adhesive, whereby an optical recording medium No. I-1 according to the present invention was obtained.

EXAMPLES I-2 to I-10

The procedure for fabrication of the optical recording medium No. I-1 in Example I-1 was repeated except that the mixture of the azo metal chelate compound A-3 and the squarylium compound B-4 employed in the recording layer in Example I-1 was replaced by the respective mixtures as shown in TABLE 1.

The structure of the azo metal chelate compounds and that of the squarylium compounds are respectively illustrated in TABLE 2 and TABLE 3.

Thus, optical recording media No. I-2 to No. I-10 according to the present invention were fabricated.

COMPARATIVE example 1

The procedure for fabrication of the optical recording medium No. I-1 in Example I-1 was repeated except that the mixture of the azo metal chelate compound A-3 and the squarylium compound B-4 employed in the recording layer in Example I-1 was replaced by a squarylium compound of formula (B-1) alone.

Thus, a comparative optical recording medium No. 1 was fabricated.

To evaluate the recording and reading characteristics of each of the above prepared optical recording media Nos. I-1 to I-10 according to the present invention and comparative optical recording medium No. 1, EFM signals were recorded in each recording medium by applying a semiconductor laser beam with a wavelength of 658 nm to each recording medium, while tracking was conducted, under the conditions that the diameter of the laser beam was 1.0 μm and the recording linear velocity was set at 3.5 m/sec.

Then, the recorded signals were read by using a continuous wave laser beam with a wavelength of 658 nm with the application of a power of 0.7 mW. The reflectance and the degree of modulation initially obtained from each recording medium were measured.

The degree of modulation means a contrast between a recorded portion and a non-recorded portion, determined from the reproduced waveform.

A light resistance test was conducted in such a manner that each recording medium was caused to deteriorate by being continuously exposed to a xenon lamp of 40,000 lux for 10 hours. After the light exposure, the reflectance and the degree of modulation of each recording medium were measured in the same manner as mentioned above.

A preservation test was conducted in such a manner that each recording medium was allowed to stand at 50° C. and 80% RH for 600 hours. After the preservation test, the reflectance and the degree of modulation of each recording medium were measured in the same manner as mentioned above.

The results are shown in TABLE 1.

TABLE 1

| | Mixture of Dyes | | Initial Stage | | After Light Exposure | | After Preservation Test | |
|---|---|---|---|---|---|---|---|---|
| | Squarylium compound | Azo metal chelate compound | Reflectance (%) | Modulation degree (%) | Reflectance (%) | Modulation degree (%) | Reflectance (%) | Modulation degree (%) |
| Ex. I-1 | B-4 *(60) | A-3 *(40) | 62 | 63 | 61 | 63 | 60 | 62 |
| Ex. I-2 | B-5 *(40) | A-4 *(60) | 53 | 64 | 52 | 65 | 54 | 64 |
| Ex. I-3 | B-13 *(50) | A-7 *(50) | 61 | 62 | 60 | 63 | 60 | 63 |

TABLE 1-continued

| | Mixture of Dyes | | Initial Stage | | After Light Exposure | | After Preservation Test | |
|---|---|---|---|---|---|---|---|---|
| | Squarylium compound | Azo metal chelate compound | Reflectance (%) | Modulation degree (%) | Reflectance (%) | Modulation degree (%) | Reflectance (%) | Modulation degree (%) |
| Ex. I-4 | B-8 *(70) | A-8 *(30) | 63 | 63 | 61 | 62 | 62 | 63 |
| Ex. I-5 | B-12 *(60) | A-12 *(40) | 61 | 60 | 59 | 62 | 58 | 61 |
| Ex. I-6 | B-9 *(40) | A-14 *(60) | 50 | 60 | 51 | 62 | 50 | 62 |
| Ex. I-7 | B-7 *(50) | A-3 *(50) | 62 | 63 | 62 | 63 | 62 | 64 |
| Ex. I-8 | B-8 *(60) | A-10 *(40) | 63 | 64 | 64 | 63 | 64 | 64 |
| Ex. I-9 | B-1 *(30) | A-11 *(20) | 66 | 63 | 66 | 63 | 67 | 62 |
| Ex. I-10 | B-6 *(20) | A-1 *(80) | 46 | 62 | 44 | 60 | 45 | 60 |
| Comp. Ex. 1 | B-1 *(100) | — | 67 | 64 | 45 | 68 | 45 | 67 |

*The mixing ratio by weight is represented in parentheses.

TABLE 2

| Compound No. | Azo Metal Chelate Compound | Metal |
|---|---|---|
| A-1 | 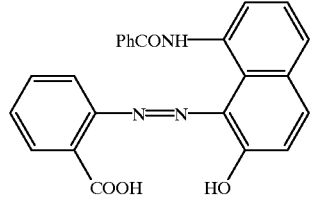 | Cu |
| A-2 | 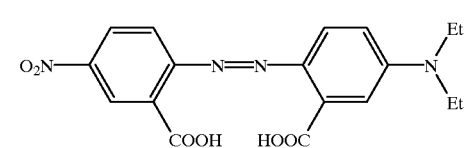 | Cu |
| A-3 | 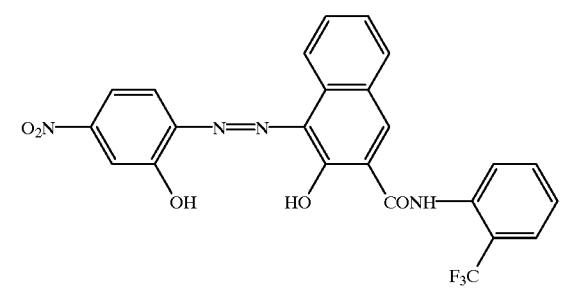 | Co |
| A-4 | 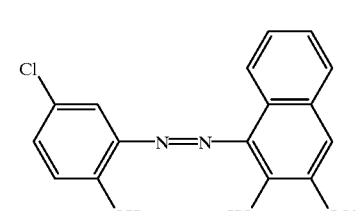 | Ni |

TABLE 2-continued

| Compound No. | Azo Metal Chelate Compound | Metal |
|---|---|---|
| A-5 | structure: 4-nitro-2-hydroxyphenyl–N=N–(2-hydroxy-4-(dimethylamino)phenyl) | Mn |
| A-6 | structure: 2-carboxyphenyl–N=N–(2-hydroxynaphthyl) | Cu |
| A-7 | structure: 4-methyl-2-hydroxyphenyl–N=N–(2-hydroxy-4-(dimethylamino)phenyl) | Ni |
| A-8 | structure: 3,4-dichloro-6-carboxyphenyl–N=N–(2-hydroxy-4-(ethylamino)phenyl) | Ni |
| A-9 | structure: 4,5-dichloro-2-hydroxyphenyl–N=N–(2-hydroxy-3-(dimethylcarbamoyl)naphthyl) | Co |
| A-10 | structure: 5-chloro-2-hydroxyphenyl–N=N–(3-amino-4-(diethylamino)phenyl) | Mn |
| A-11 | structure: 4-nitro-2-hydroxyphenyl–N=N–(2-hydroxy-4-(diethylamino)phenyl) | Mn |
| A-12 | structure: 4-chloro-6-carboxyphenyl–N=N–(2-hydroxy-4-(dibutylamino)phenyl) | Mn |

TABLE 2-continued

| Compound No. | Azo Metal Chelate Compound | Metal |
|---|---|---|
| A-13 | (structure: 4-methoxy-2-hydroxyphenyl–N=N–(2-mercaptonaphthalen-1-yl)) | Ni |
| A-14 | (structure: 4-nitro-2-hydroxyphenyl–N=N–naphthalene bearing MeHNO$_2$S and OH substituents) | Cu |

TABLE 3

| Compound No. | Squarylium Compound |
|---|---|
| B-1 | (squarylium dye with 1,3,3-trimethylindoline and 1-phenyl-3-methyl-5-hydroxypyrazole groups) |
| B-2 | (squarylium dye with 1,3,3-trimethylindoline and NH-linked 3-hydroxy-4-(phenylazo)phenyl group) |
| B-3 | (squarylium dye with 1,3-di-n-butyl-imidazo[4,5-b]quinoxaline and NH-linked 8-quinolinyl group) |

TABLE 3-continued

| Compound No. | Squarylium Compound |
| --- | --- |
| B-4 | |
| B-5 | |
| B-6 | |
| B-7 | |
| B-8 | |
| B-9 | |

TABLE 3-continued

| Compound No. | Squarylium Compound |
|---|---|
| B-10 | |
| B-11 | |
| B-12 | |
| B-13 | |
| B-14 | |
| B-15 | |
| B-16 | |

TABLE 3-continued

| Compound No. | Squarylium Compound |
|---|---|
| B-17 | |
| B-18 | |
| B-19 | |
| B-20 | |
| B-21 | |

EXAMPLE II-1

Fabrication of Optical Recording Medium No. II-1
(Formation of Recording Layer)

A guide groove with a depth of 1700 Å, a half width of 0.23 μm, and a track pitch of 0.74 μm was formed on one surface of a polycarbonate substrate with a thickness of 0.6 mm by injection molding. A mixture of an azo metal chelate compound A'-3 (shown in TABLE 5) and a squarylium compound B-18 (shown in TABLE 3) in a mixing ratio by weight of 50:50, as shown in TABLE 4, was dissolved in 2,2,3,3-tetrafluoropropanol. The solution thus obtained was applied to the surface of the polycarbonate substrate by spinner coating, whereby a recording layer with a thickness of 900 Å was provided on the substrate.

(Formation of Reflection Layer)

A silver reflection layer with a thickness of 1300 Å was formed on the recording layer by sputtering.

(Formation of Protective Layer)

A protective layer with a thickness of 6 μm was provided on the reflection layer using an acrylic photopolymer.

Furthermore, another injection molded polycarbonate substrate with a thickness of 0.6 mm was attached to the protective layer with an adhesive, whereby an optical recording medium No. II-1 according to the present invention was obtained.

EXAMPLES II-2 to II-10

The procedure for fabrication of the optical recording medium No. II-1 in Example II-1 was repeated except that the mixture of the azo metal chelate compound A'-3 and the squarylium compound B-18 employed in the recording layer in Example II-1 was replaced by the respective mixtures as shown in TABLE 4.

The structure of the azo metal chelate compounds and that of the squarylium compounds are respectively shown in TABLE 5 and TABLE 3.

Thus, optical recording media No. II-2 to No. II-10 according to the present invention were fabricated.

To evaluate the recording and reading characteristics of the above prepared optical recording media Nos. II-1 to II-10 according to the present invention, EFM signals were recorded in each recording medium by applying a semiconductor laser beam with a wavelength of 658 nm to each recording medium, while tracking was conducted, under the conditions that the diameter of the laser beam was 1.0 μm and the recording linear velocity was set at 3.5 m/sec.

Then, the recorded signals were read by using a continuous wave laser beam with a wavelength of 658 nm with the application of a power of 0.7 mW. The reflectance and the degree of modulation initially obtained from each recording medium were measured.

A light resistance test was conducted in such a manner that each recording medium was caused to deteriorate by being continuously exposed to a xenon lamp of 40,000 lux for 10 hours. After the light exposure, the reflectance and the degree of modulation of each recording medium were measured in the same manner as mentioned above.

A preservation test was conducted in such a manner that each recording medium was allowed to stand at 50° C. and 80% RH for 600 hours. After the preservation test, the reflectance and the degree of modulation of each recording medium were measured in the same manner as mentioned above.

The results are shown in TABLE 4.

TABLE 4

| | Mixture of Dyes | | Initial Stage | | After Light Exposure | | After Preservation Test | |
|---|---|---|---|---|---|---|---|---|
| | Squarylium compound | Azo metal chelate compound | Reflectance (%) | Modulation degree (%) | Reflectance (%) | Modulation degree (%) | Reflectance (%) | Modulation degree (%) |
| Ex. II-1 | B-18 *(50) | A'-3 *(50) | 60 | 64 | 59 | 63 | 60 | 63 |
| Ex. II-2 | B-11 *(40) | A'-7 *(60) | 56 | 65 | 56 | 66 | 55 | 64 |
| Ex. II-3 | B-10 *(50) | A'-14 *(50) | 61 | 62 | 60 | 61 | 61 | 61 |
| Ex. II-4 | B-19 *(60) | A'-5 *(40) | 63 | 63 | 61 | 62 | 62 | 63 |
| Ex. II-5 | B-7 *(60) | A'-12 *(40) | 61 | 60 | 59 | 62 | 58 | 61 |
| Ex. II-6 | B-8 *(30) | A'-7 *(70) | 49 | 61 | 48 | 62 | 47 | 63 |
| Ex. II-7 | B-17 *(50) | A'-1 *(50) | 62 | 63 | 62 | 63 | 62 | 64 |
| Ex. II-8 | B-1 *(50) | A'-10 *(50) | 61 | 65 | 59 | 62 | 60 | 63 |
| Ex. II-9 | B-14 *(80) | A'-11 *(20) | 66 | 63 | 66 | 63 | 67 | 62 |
| Ex. II-10 | B-10 *(20) | A'-4 *(80) | 46 | 62 | 44 | 60 | 45 | 60 |
| Comp. Ex. 1 | B-1 *(100) | — | 67 | 64 | 45 | 68 | 45 | 67 |

*The mixing ratio by weight is represented in parentheses.

TABLE 5

| Compound No. | Azo Metal Chelate Compound | Metal |
|---|---|---|
| A'-1 | 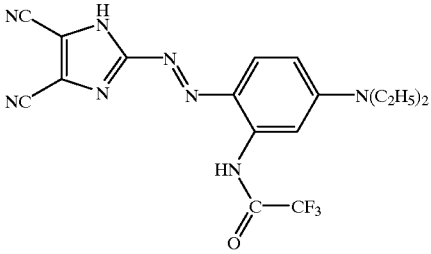 | Co |

TABLE 5-continued

| Compound No. | Azo Metal Chelate Compound | Metal |
|---|---|---|
| A'-2 | [structure: 4,6-di-tert-butoxy-1,3,5-triazin-2-yl azo-linked to phenyl with N(C₂H₅)₂ and NHSO₂-C₆H₄-C₂H₅ substituents] | Cu |
| A'-3 | [structure: 4,6-dimethylpyridin-2-yl azo-linked to phenyl with N(CH₃)₂ and HO₃S substituents] | Mn |
| A'-4 | [structure: 6-methylbenzothiazol-2-yl azo-linked to phenyl with N(C₃H₇)₂ and OH substituents] | Cu |
| A'-5 | [structure: 4-methylquinolin-2-yl azo-linked to phenyl with N(C₂H₅)₂ and NHCO-C₆H₅ substituents] | Ni |
| A'-6 | [structure: 6-methoxypyridin-2-yl azo-linked to naphthyl with SO₂N(CH₃)₂, OH, and HN-SO₂CF₃ substituents] | Ni |
| A'-7 | [structure: 4-phenylthiazol-2-yl azo-linked to phenyl with N(CH₃)₂ and HOOC substituents] | Cu |
| A'-8 | [structure: pyrimidin-2-yl azo-linked to naphthyl with SO₂N(C₂H₅)₂, OH, and HO substituents] | Mn |

TABLE 5-continued

| Compound No. | Azo Metal Chelate Compound | Metal |
|---|---|---|
| A'-9 | | Co |
| A'-10 | | Cu |
| A'-11 | | Ni |
| A'-12 | | Cu |
| A'-13 | | Ni |
| A'-14 | | Mn |

According to the present invention, recording and reading can be achieved by use of a laser beam with a wavelength of 670 nm or less as mentioned above. Further, the light resistance and the preservation stability of the obtained optical recording medium are excellent. In particular, the optical recording medium of the present invention is superior to that employing a squarylium compound alone as the recording material in terms of light resistance.

In addition, the reflectance of the optical recording medium of the present invention is high and stable, and the degree of modulation is high in the course of recording and reading operations.

Japanese Patent Application No. 2000-062437 filed Mar. 7, 2000, and Japanese Patent Applications Nos. 2001-036632 and 2001-036663 filed Feb. 14, 2001, are hereby incorporated by reference.

What is claimed is:

1. An optical recording medium comprising a substrate and a recording layer formed thereon, said recording layer comprising at least one squarylium compound and one azo metal chelate compound comprising an azo moiety of formula (I-1) and a metal:

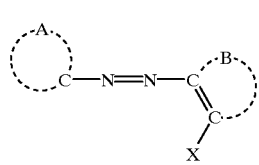

(I-1)

wherein A and B are each independently a residue for forming an aromatic ring which may have a substituent or a heterocyclic ring which may have a substituent in combination with one or two carbon atoms bonded thereto; and X represents a substituent having an active hydrogen group, and wherein said squarylium compound is selected from the group consisting of:
a compound represented by formula (II):

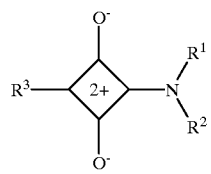

(II)

wherein $R^1$ and $R^2$, which may be the same or different, are each a hydrogen atom, a substituted or unsubstituted alkyl group, a substituted or unsubstituted aralkyl group, or a substituted or unsubstituted aryl group, or $R^1$ and $R^2$ may form a heterocyclic ring which may have a substituent in combination with a nitrogen atom bonded thereto; and $R^3$ is represented by formula (III) dr (IV)

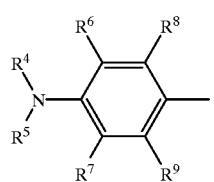

(III)

wherein $R^4$ and $R^5$, which may be the same or different, are each a hydrogen atom or an alkyl group, or $R^4$ and $R^5$ may form a heterocyclic ring which may have a substituent in combination with a nitrogen atom bonded thereto; and $R^6$, $R^7$, $R^8$, and $R^9$, which may be the same or different, are each a hydrogen atom, a substituted or unsubstituted alkyl group, a substituted or unsubstituted alkoxyl group, hydroxyl group, or a halogen atom, and $R^4$ and $R^6$, and $R^5$ and $R^7$ may independently form a heterocyclic ring, which may have a substituent, in combination with a nitrogen atom and two carbon atoms bonded thereto;

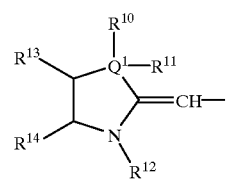

(IV)

wherein $Q^1$ is a carbon atom or a nitrogen atom; $R^{10}$ and $R^{11}$, which may be the same or different, are each a hydrogen atom, a substituted or unsubstituted alkyl group, a substituted or unsubstituted aryl group, a substituted or unsubstituted aralkyl group, or hydroxyl group, provided that $R^{11}$ does not exist when $Q^1$ is a nitrogen atom; $R^{12}$ is a hydrogen atom, a substituted or unsubstituted alkyl group, a substituted or unsubstituted aryl group, or a substituted or unsubstituted aralkyl group; $R^{13}$ and $R^{14}$, which may be the same or different, are each a hydrogen atom, a substituted or unsubstituted alkyl group, an alkoxyl group, or a halogen atom, or $R^{13}$ and $R^{14}$ may form an alicyclic hydrocarbon ring, an aromatic ring which may have a substituent, or a heterocyclic ring which may have a substituent, in combination with two carbon atoms bonded thereto; and a compound represented by formula (V)

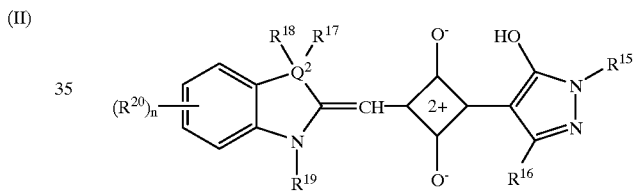

(V)

wherein $Q^2$ is a carbon atom or a nitrogen atom; $R^{15}$ is a hydrogen atom, a substituted or unsubstituted alkyl group, a substituted or unsubstituted aryl group, or a substituted or unsubstituted heterocyclic group; $R^{16}$ is a hydrogen atom, a halogen atom, a substituted or unsubstituted alkyl group, a substituted or unsubstituted alkoxyl group, a substituted or unsubstituted aralkyl group, a substituted or unsubstituted aryl group, a substituted or unsubstituted amino group, or a substituted or unsubstituted heterocyclic group; $R^{17}$ and $R^{18}$, which may be the same or different, are each a substituted or unsubstituted alkyl group, or when $Q^2$ is a carbon atom, $R^{17}$ and $R^{18}$ may form an alicyclic hydrocarbon ring or a heterocyclic ring in combination with said carbon atom bonded thereto, whereas when $Q^2$ is a nitrogen atom, $R^{18}$ does not exist; $R^{19}$ is a hydrogen atom, a substituted or unsubstituted alkyl group, a substituted or unsubstituted aralkyl group, or a substituted or unsubstituted aryl group; $R^{20}$ is a halogen atom, a substituted or unsubstituted alkyl group, a substituted or unsubstituted aralkyl group, a substituted or unsubstituted aryl group, trifluoromethyl group, nitro group, cyano group, or a substituted or unsubstituted alkoxyl group; and n is an integer of 0 to 4, provided that when n is an integer of 2 to 4, a plurality of groups represented by $R^{20}$ may be the same or different, and in this case, adjacent groups of $R^{20}$ may form an aromatic ring which may have a substituent in combination with two carbon atoms bonded thereto.

2. An optical recording medium comprising a substrate and a recording layer formed thereon, said recording layer comprising at least one squarylium compound and one azo metal chelate compound comprising an azo moiety of formula (I-2) and a metal:

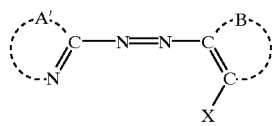

(I-2)

wherein A' is a residue for forming a heterocyclic ring in combination with a carbon atom and a nitrogen atom bonded thereto; B is a residue for forming an aromatic ring or a heterocyclic ring in combination with two carbon atoms bonded thereto; and X represents a substituent having an active hydrogen group, and wherein said squarylium compound is selected from the group consisting of:
a compound represented by formula (II)

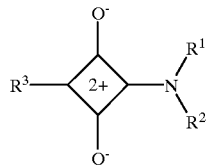

(II)

wherein $R^1$ and $R^2$, which may be the same or different, are each a hydrogen atom, a substituted or unsubstituted alkyl group, a substituted or unsubstituted aralkyl group, or a substituted or unsubstituted aryl group, or $R^1$ and $R^2$ may form a heterocyclic ring which may have a substituent in combination with a nitrogen atom bonded thereto; and $R^3$ is represented by formula (III) or (IV):

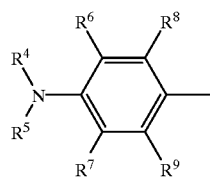

(III)

wherein $R^4$ and $R^5$, which may be the same or different, are each a hydrogen atom or an alkyl group, or R4 and R5 may form a heterocyclic ring which may have a substituent in combination with a nitrogen atom bonded thereto; and $R^6$, $R^7$, $R^8$, and $R^9$, which may be the same or different, are each a hydrogen atom, a substituted or unsubstituted alkyl group, a substituted or unsubstituted alkoxyl group, hydroxyl group, or a halogen atom, and $R^4$ and $R^6$, and $R^5$ and $R^7$ may independently form a heterocyclic ring, which may have a substituent, in combination with a nitrogen atom and two carbon atoms bonded thereto;

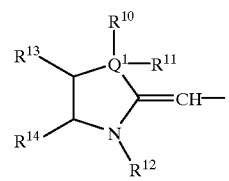

(IV)

wherein $Q^1$ is a carbon atom or a nitrogen atom; $R^{10}$ and $R^{11}$, which may be the same or different, are each a hydrogen atom, a substituted or unsubstituted alkyl group, a substituted or unsubstituted aryl group, a substituted or unsubstituted aralkyl group, or hydroxyl group, provided that $R^{11}$ does not exist when $Q^1$ is a nitrogen atom; $R^{12}$ is a hydrogen atom, a substituted or unsubstituted alkyl group, a substituted or unsubstituted aryl group, or a substituted or unsubstituted aralkyl group; $R^{13}$ and $R^{14}$, which may be the same or different, are each a hydrogen atom, a substituted or unsubstituted alkyl group, an alkoxyl group, or a halogen atom, or $R^{13}$ and $R^{14}$ may form an alicyclic hydrocarbon ring, an aromatic ring which may have a substituent, or a heterocyclic ring which may have a substituent, in combination with two carbon atoms bonded thereto; and a compound represented by formula (V):

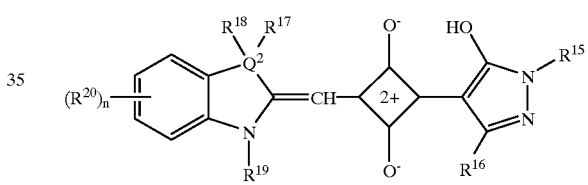

(V)

wherein $Q^2$ is a carbon atom or a nitrogen atom; $R^{15}$ is a hydrogen atom, a substituted or unsubstituted alkyl group, a substituted or unsubstituted aryl group, or a substituted or unsubstituted heterocyclic group; $R^{16}$ is a hydrogen atom, a halogen atom, a substituted or unsubstituted alkyl group, a substituted or unsubstituted alkoxyl group, a substituted or unsubstituted aralkyl group, a substituted or unsubstituted aryl group, a substituted or unsubstituted amino group, or a substituted or unsubstituted heterocyclic group; $R^{17}$ and $R^{18}$, which may be the same or different, are each a substituted or unsubstituted alkyl group, or when $Q^2$ is a carbon atom, $R^{17}$ and $R^{18}$ may form an alicyclic hydrocarbon ring or a heterocyclic ring in combination with said carbon atom bonded thereto, whereas when $Q^2$ is a nitrogen atom, $R^{18}$ does not exist; $R^{19}$ is a hydrogen atom, a substituted or unsubstituted alkyl group, a substituted or unsubstituted aralkyl group, or a substituted or unsubstituted aryl group; $R^{20}$ is a halogen atom, a substituted or unsubstituted alkyl group, a substituted or unsubstituted aralkyl group, a substituted or unsubstituted aryl group, trifluoromethyl group, nitro group, cyano group, or a substituted or unsubstituted alkoxyl group; and n is an integer of 0 to 4, provided that when n is an integer of 2 to 4, a plurality of groups represented by $R^{20}$ may be the same or different, and in this case, adjacent groups of $R^{20}$ may form an aromatic ring which may have a substituent in combination with two carbon atoms bonded thereto.

3. The optical recording medium as claimed in claim 1, wherein said squarylium compound and said azo metal chelate compound are contained in a mixing ratio by weight of (90:10) to (10:90).

4. The optical recording medium as claimed in claim 2, wherein said squarylium compound and said azo metal chelate compound are contained in a mixing ratio by weight of (90:10) to (10:90).

5. The optical recording medium as claimed in claim 1, wherein said metal of said azo metal chelate compound is selected from the group consisting of manganese, cobalt, nickel, and copper.

6. The optical recording medium as claimed in claim 2, wherein said metal of said azo metal chelate compound is selected from the group consisting of manganese, cobalt, nickel, and copper.

7. The optical recording medium as claimed in claim 1, wherein said recording layer has a refractive index of 1.5 to 3.0, and an extinction coefficient of 0.02 to 0.3, within a wavelength region ±5 nm of a predetermined light for recording and reading.

8. The optical recording medium as claimed in claim 2, wherein said recording layer itself has a refractive index of 1.5 to 3.0, and an extinction coefficient of 0.02 to 0.3, within a wavelength region ±5 nm of a predetermined light for recording and reading.

9. The optical recording medium as claimed in claim 1, further comprising a reflection layer which is provided on said recording layer and comprises a material selected from the group consisting of metal elements of gold, silver, copper, and aluminum, and alloys of said metal elements.

10. The optical recording medium as claimed in claim 2, further comprising a reflection layer which is provided on said recording layer and comprises a material selected from the group consisting of metal elements of gold, silver, copper, and aluminum, and alloys of said metal elements.

11. The optical recording medium as claimed in claim 1, wherein said substrate bears thereon a guide groove with a track pitch of 0.7 to 0.8 μm and a half width of 0.18 to 0.40 μm.

12. The optical recording medium as claimed in claim 2, wherein said substrate bears thereon a guide groove with a track pitch of 0.7 to 0.8 μm and a half width of 0.18 to 0.40 μm.

13. The optical recording medium as claimed in claim 1, wherein said recording medium performs recording and reading by the application of light with wavelengths of 600 to 720 nm to said recording medium.

14. The optical recording medium as claimed in claim 2, wherein said recording medium performs recording and reading by the application of light with wavelengths of 600 to 720 nm to said recording medium.

15. A recording and reading method using an optical recording medium, comprising the steps of recording information in said optical recording medium by applying light with wavelengths of 600 to 720 nm to said optical recording medium, and reading said information from said recording medium by applying light with wave-lengths of 600 to 720 nm to said optical recording medium, said optical recording medium comprising a substrate and a recording layer formed thereon, said recording layer comprising at least one squarylium compound and one azo metal chelate compound comprising an azo moiety of formula (I-1) and a metal:

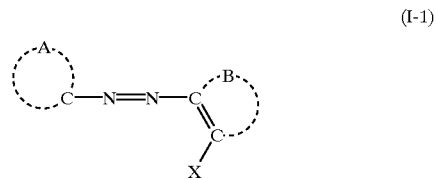

(I-1)

wherein A and B are each independently a residue for forming an aromatic ring which may have a substituent or a heterocyclic ring which may have a substituent in combination with one or two carbon atoms bonded thereto; and X represents a substituent having an active hydrogen group, and wherein said squarylium compound is selected from the group consisting of:

a compound represented by formula (II):

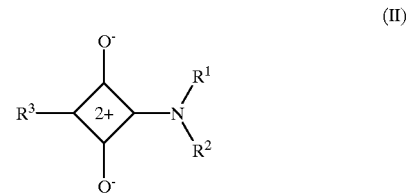

(II)

wherein $R^1$ and $R^2$, which may be the same or different, are each a hydrogen atom, a substituted or unsubstituted alkyl group, a substituted or unsubstituted aralkyl group, or a substituted or unsubstituted aryl group, or $R^1$ and $R^2$ may form a heterocyclic ring which may have a substituent in combination with a nitrogen atom bonded thereto; and $R^3$ is represented by formula (III) or (IV):

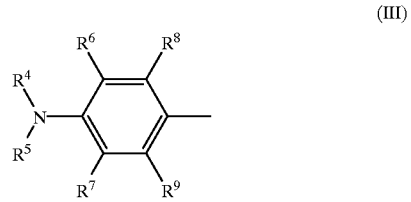

(III)

wherein $R^4$ and $R^5$, which may be the same or different, are each a hydrogen atom or an alkyl group, or $R^4$ and $R^5$ may form a heterocyclic ring which may have a substituent in combination with a nitrogen atom bonded thereto; and $R^6$, $R^7$, $R^8$, and $R^9$, which may be the same or different, are each a hydrogen atom, a substituted or unsubstituted alkyl group, a substituted or unsubstituted alkoxyl group, hydroxyl group, or a halogen atom, and $R^4$ and $R^6$, and $R^5$ and $R^7$ may independently form a heterocyclic ring, which may have a substituent, in combination with a nitrogen atom and two carbon atoms bonded thereto;

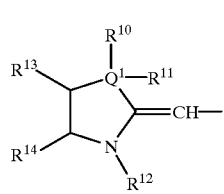

(IV)

wherein $Q^1$ is a carbon atom or a nitrogen atom; $R^{10}$ and $R^{11}$, which may be the same or different, are each a hydrogen atom, a substituted or unsubstituted alkyl group, a substituted or unsubstituted aryl group, a substituted or unsubstituted aralkyl group, or hydroxyl group, provided that $R^{11}$ does not exist when $Q^1$ is a nitrogen atom; $R^{12}$ is a hydrogen atom, a substituted or unsubstituted alkyl group, a substituted or unsubstituted aryl group, or a substituted or unsubstituted aralkyl group; $R^{13}$ and $R^{14}$, which may be the same or different, are each a hydrogen atom, a substituted or unsubstituted alkyl group, an alkoxyl group, or a halogen atom, or $R^{13}$ and $R^{14}$ may form an alicyclic hydrocarbon ring, an aromatic ring which may have a substituent, or a heterocyclic ring which may have a substituent, in combination with two carbon atoms bonded thereto; and a compound represented by formula (V):

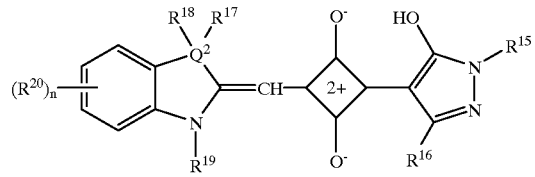

(V)

wherein $Q^2$ is a carbon atom or a nitrogen atom; $R^{15}$ is a hydrogen atom, a substituted or unsubstituted alkyl group, a substituted or unsubstituted aryl group, or a substituted or unsubstituted heterocyclic group; $R^{16}$ is a hydrogen atom, a halogen atom, a substituted or unsubstituted alkyl group, a substituted or unsubstituted alkoxyl group, a substituted or unsubstituted aralkyl group, a substituted or unsubstituted aryl group, a substituted or unsubstituted amino group, or a substituted or unsubstituted heterocyclic group; $R^{17}$ and $R^{18}$, which may be the same or different, are each a substituted or unsubstituted alkyl group, or when $Q^2$ is a carbon atom, $R^{17}$ and $R^{16}$ may form an alicyclic hydrocarbon ring or a heterocyclic ring in combination with said carbon atom bonded thereto, whereas when $Q^2$ is a nitrogen atom, $R^{18}$ does not exist; $R^{19}$ is a hydrogen atom, a substituted or unsubstituted alkyl group, a substituted or unsubstituted aralkyl group, or a substituted or unsubstituted aryl group; $R^{20}$ is a halogen atom, a substituted or unsubstituted alkyl group, a substituted or unsubstituted aralkyl group, a substituted or unsubstituted aryl group, trifluoromethyl group, nitro group, cyano group, or a substituted or unsubstituted alkoxyl group; and n is an integer of 0 to 4, provided that when n is an integer of 2 to 4, a plurality of groups represented by $R^{20}$ may be the same or different, and in this case, adjacent groups of $R^{20}$ may form an aromatic ring which may have a substituent in combination with two carbon atoms bonded thereto.

16. A recording and reading method using an optical recording medium, comprising the steps of recording information in said optical recording medium by applying light with wavelengths of 600 to 720 nm to said optical recording medium, and reading said information from said recording medium by applying light with wave-lengths of 600 to 720 nm to said optical recording medium, said optical recording medium comprising a substrate and a recording layer formed thereon, said recording layer comprising at least one squarylium compound and one azo metal chelate compound comprising an azo moiety of formula (I-2) and a metal:

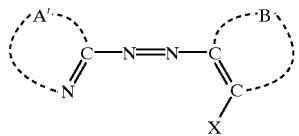

(I-2)

wherein A' is a residue for forming a heterocyclic ring in combination with a carbon atom and a nitrogen atom bonded thereto; B is a residue for forming an aromatic ring or a heterocyclic ring in combination with two carbon atoms bonded thereto; and X represents a substituent having an active hydrogen group, and wherein said squarylium compound is selected from the group consisting of:

a compound represented by formula (II)

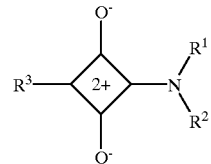

(II)

wherein $R^1$ and $R^2$, which may be the same or different, are each a hydrogen atom, a substituted or unsubstituted alkyl group, a substituted or unsubstituted aralkyl group, or a substituted or unsubstituted aryl group, or $R^1$ and $R^2$ may form a heterocyclic ring which may have a substituent in combination with a nitrogen atom bonded thereto; and $R^3$ is represented by formula (III) or (IV):

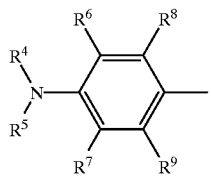

(III)

wherein $R^4$ and $R^5$, which may be the same or different, are each a hydrogen atom or an alkyl group, or $R^4$ and $R^5$ may form a heterocyclic ring which may have a substituent in combination with a nitrogen atom bonded thereto; and $R^6$, $R^7$, $R^8$, and $R^9$, which may be the same or different, are each a hydrogen atom, a substituted or unsubstituted alkyl group, a substituted or unsubstituted alkoxyl group, hydroxyl group, or a halogen atom, and $R^4$ and $R^6$, and $R^5$ and $R^7$ may independently form a heterocyclic ring, which may have a substituent, in combination with a nitrogen atom and two carbon atoms bonded thereto;

(IV)

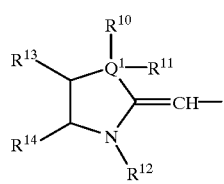

wherein $Q^1$ is a carbon atom or a nitrogen atom; $R^{10}$ and $R^{11}$, which may be the same or different, are each a hydrogen atom, a substituted or unsubstituted alkyl group, a substituted or unsubstituted aryl group, a substituted or unsubstituted aralkyl group, or hydroxyl group, provided that $R^{11}$ does not exist when $Q^1$ is a nitrogen atom; $R^{12}$ is a hydrogen atom, a substituted or unsubstituted alkyl group, a substituted or unsubstituted aryl group, or a substituted or unsubstituted aralkyl group; $R^{13}$ and $R^{14}$, which may be the same or different, are each a hydrogen atom, a substituted or unsubstituted alkyl group, an alkoxyl group, or a halogen atom, or $R^{13}$ and $R^{14}$ may form an alicyclic hydrocarbon ring, an aromatic ring which may have a substituent, or a heterocyclic ring which may have a substituent, in combination with two carbon atoms bonded thereto; and a compound represented by formula (V):

(V)

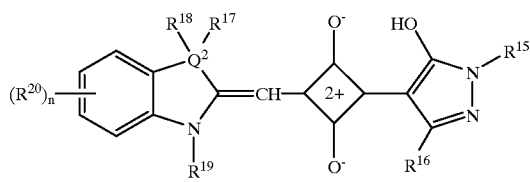

wherein $Q^2$ is a carbon atom or a nitrogen atom; $R^{15}$ is a hydrogen atom, a substituted or unsubstituted alkyl group, a substituted or unsubstituted aryl group, or a substituted or unsubstituted heterocyclic group; $R^{16}$ is a hydrogen atom, a halogen atom, a substituted or unsubstituted alkyl group, a substituted or unsubstituted alkoxyl group, a substituted or unsubstituted aralkyl group, a substituted or unsubstituted aryl group, a substituted or unsubstituted amino group, or a substituted or unsubstituted heterocyclic group; $R^{17}$ and $R^{18}$, which may be the same or different, are each a substituted or unsubstituted alkyl group, or when $Q^2$ is a carbon atom, $R^{17}$ and $R^{18}$ may form an alicyclic hydrocarbon ring or a heterocyclic ring in combination with said carbon atom bonded thereto, whereas when $Q^2$ is a nitrogen atom, $R^{18}$ does not exist; $R^{19}$ is a hydrogen atom, a substituted or unsubstituted alkyl group, a substituted or unsubstituted aralkyl group, or a substituted or unsubstituted aryl group; $R^{20}$ is a halogen atom, a substituted or unsubstituted alkyl group, a substituted or unsubstituted aralkyl group, a substituted or unsubstituted aryl group, trifluoromethyl group, nitro group, cyano group, or a substituted or unsubstituted alkoxyl group; and n is an integer of 0 to 4, provided that when n is an integer of 2 to 4, a plurality of groups represented by $R^{20}$ may be the same or different, and in this case, adjacent groups of $R^{20}$ may form an aromatic ring which may have a substituent in combination with two carbon atoms bonded thereto.

* * * * *